(12) United States Patent
Kim et al.

(10) Patent No.: US 8,363,391 B2
(45) Date of Patent: Jan. 29, 2013

(54) PORTABLE TERMINAL

(75) Inventors: Won-Tae Kim, Suwon-si (KR);
Yun-Cheol Kang, Gunpo-si (KR);
Sung-Ho Ahn, Seoul (KR);
Chung-Keun Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 166 days.

(21) Appl. No.: 13/007,001

(22) Filed: Jan. 14, 2011

(65) Prior Publication Data
US 2011/0182011 A1 Jul. 28, 2011

(30) Foreign Application Priority Data

Jan. 26, 2010 (KR) .................. 10-2010-0007162
Oct. 8, 2010 (KR) .................. 10-2010-0098356
Dec. 21, 2010 (KR) .................. 10-2010-0131679

(51) Int. Cl.
*H05K 5/00* (2006.01)
*F16C 11/00* (2006.01)
*H04M 1/00* (2006.01)

(52) U.S. Cl. ............. 361/679.01; 455/575.3; 455/575.4; 403/113; 361/679.56; 361/755

(58) Field of Classification Search ............ 361/679.56, 361/755, 679.3, 679.4, 679.06, 679.27, 679.12, 361/679.14, 679.29, 679.39; 455/575.3, 455/575.4; 403/113
See application file for complete search history.

(56) References Cited

U.S. PATENT DOCUMENTS

| | | | | |
|---|---|---|---|---|
| 4,960,256 A | * | 10/1990 | Chihara et al. ............. 248/286.1 |
| 5,548,478 A | * | 8/1996 | Kumar et al. ............. 361/679.27 |
| 7,187,364 B2 | * | 3/2007 | Duarte et al. .................. 345/168 |
| 7,413,152 B1 | * | 8/2008 | Chen .......................... 248/176.1 |
| 7,448,872 B2 | * | 11/2008 | Im ..................................... 439/10 |
| 7,561,443 B2 | * | 7/2009 | Todoroki et al. ............... 361/814 |
| 7,611,113 B2 | * | 11/2009 | Lai ............................. 248/286.1 |
| 7,650,671 B2 | * | 1/2010 | Lee ................................. 16/362 |
| 7,907,415 B2 | * | 3/2011 | Ueyama ........................ 361/749 |
| 7,975,348 B2 | * | 7/2011 | Lin ................................. 16/337 |
| 8,011,632 B2 | * | 9/2011 | Wang et al. ................ 248/284.1 |
| 8,018,714 B2 | * | 9/2011 | Luke et al. ............... 361/679.01 |

(Continued)

FOREIGN PATENT DOCUMENTS

| | | |
|---|---|---|
| JP | 2007-74411 A | 3/2007 |
| KR | 10-2006-0031019 A | 4/2006 |

(Continued)

*Primary Examiner* — Jinhee Lee
*Assistant Examiner* — Abhishek Rathod
(74) *Attorney, Agent, or Firm* — Jefferson IP Law, LLP

(57) ABSTRACT

A portable terminal including a pair of housings and a hinge apparatus for coupling the housings in such a way that the housings pivot with respect to each other is provided. The hinge apparatus includes a hinge bracket fixed to a first housing of the pair of housings, a pivot member connected to a second housing of the pair of housings and pivotably coupled to the hinge bracket to pivot with respect to a hinge axis, a cam surface provided on the pivot member around the hinge axis, the cam surface comprising at least a pair of recess portions, and a cam member received to protrude and retreat in perpendicular to the hinge axis on the hinge bracket. When the pivot member pivots, the cam member slides and contacts the cam surface and is engaged with one of the recess portions on the cam surface.

28 Claims, 18 Drawing Sheets

U.S. PATENT DOCUMENTS

| | | | |
|---|---|---|---|
| 8,086,290 B2 * | 12/2011 | Yoon et al. | 455/575.4 |
| 8,190,219 B2 * | 5/2012 | Park et al. | 455/575.4 |
| 2003/0142474 A1 * | 7/2003 | Karidis et al. | 361/683 |
| 2005/0002159 A1 * | 1/2005 | Jeong | 361/683 |
| 2005/0124395 A1 * | 6/2005 | Bae et al. | 455/575.3 |
| 2006/0232921 A1 * | 10/2006 | Brandenberg et al. | 361/683 |
| 2007/0082695 A1 * | 4/2007 | Yoon et al. | 455/550.1 |
| 2007/0184882 A1 * | 8/2007 | Kim | 455/575.4 |
| 2008/0052874 A1 * | 3/2008 | Liu | 16/246 |
| 2008/0081505 A1 * | 4/2008 | Ou et al. | 439/374 |
| 2008/0161075 A1 * | 7/2008 | Kim et al. | 455/575.4 |
| 2008/0174942 A1 * | 7/2008 | Yang et al. | 361/680 |
| 2008/0304215 A1 * | 12/2008 | Chiu | 361/681 |
| 2009/0227301 A1 * | 9/2009 | Lindvall | 455/575.4 |
| 2009/0286580 A1 * | 11/2009 | Murakoso et al. | 455/575.4 |

FOREIGN PATENT DOCUMENTS

KR  10-0702709 B1  3/2007

* cited by examiner

PORTABLE TERMINAL

PRIORITY

This application claims the benefit under 35 U.S.C. §119 (a) of a Korean patent application filed in the Korean Intellectual Property Office on Jan. 26, 2010 and assigned Serial No. 10-2010-0007162, a Korean patent application filed in the Korean Intellectual Property Office on Oct. 8, 2010, and assigned Serial No. 10-2010-0098356, and a Korean patent application filed in the Korean Intellectual Property Office on Dec. 21, 2010, and assigned Serial No. 10-2010-0131679, the entire disclosures of each of which are hereby incorporated by reference.

BACKGROUND OF THE INVENTION

1. Field of the Invention

The present invention relates to a portable terminal. More particularly, the present invention relates to a portable terminal including a hinge apparatus which pivotably couples a pair of housings.

2. Description of the Related Art

Generally, a "portable terminal" refers to a device allowing a user to use a mobile communication function while carrying the device. Conventional portable terminals may be classified into various types according to their appearance, such as bar-type portable terminals, flip-type portable terminals, and folder-type portable terminals.

The bar-type portable terminal has a single housing on which data input/output means, a transmitter, and a receiver are mounted. Since a keypad used as the data input/output means in a bar-type portable terminal is always exposed, the constant exposure may result in malfunction. Further, there is a limitation in the miniaturization of the bar-type portable terminal because it is difficult to provide a sufficient distance between the transmitter and the receiver.

The flip-type portable terminal includes a body, a flip panel, and a hinge module connecting the flip panel to the body. The body of the flip-type portable terminal includes data input/output means, a transmitter, and a receiver mounted thereon. In the flip-type portable terminal, the flip panel can in the closed state cover and thereby protect a keypad used as the data input/output means, so as to prevent the malfunctioning of the keypad. However, there is an actual limitation in the miniaturization of the flip-type portable terminal because it is difficult to provide a sufficient distance between the transmitter and the receiver.

The folder-type portable terminal includes a body, a folder, and a hinge module connecting the folder to the portable terminal body. The folder rotates so as to be opened and closed. In a state that the folder is in close contact with the portable terminal body, the portable terminal is set in a communication standby mode, and thus is prevented from malfunctioning In a communication mode, the folder is unfolded so that a sufficient distance between the transmitter and the receiver is obtained. Thus, the folder-type portable terminal is advantageous to miniaturization.

According to diversification of designs of the portable terminals of the related art, sliding-type portable terminals, which respectively include two housings, one of which slides on the other housing, have been commercialized.

Mobile communication services through portable terminals, which provided simple voice communication or short text message transmission at their early stages of development, are now providing more service contents, such as games, large-size file transmission, Internet access, or the like, and emphasizing a multimedia function, such as reproduction of moving image files. The multimedia function realized by the portable terminals may include music file reproduction, broadcasting viewing, moving image file reproduction, and so forth. In broadcasting viewing or moving image file reproduction, generally, a larger screen can be provided by positioning a display device in a horizontal orientation. Moreover, when the display device can be positioned inclined with respect to a horizontal surface, a user can comfortably enjoy the multimedia function without needing to directly hold the portable terminal.

In case of the folder-type portable terminal, when the folder having installed thereon the display device is opened, the folder can be positioned inclined with respect to the portable terminal body, thus easily positioning the display device to be inclined with respect to a horizontal surface. However, the bar-type portable terminal or the sliding-type portable terminal includes a single housing, or even when including a pair of housings, is structured such that the housings move while being in parallel with each other, making it difficult to position the display device to be inclined with respect to a horizontal surface.

SUMMARY OF THE INVENTION

An aspect of the present invention is to address at least the above-mentioned problems and/or disadvantages and to provide at least the advantages described below. Accordingly, an aspect of the present invention is to provide a portable terminal allowing a user to comfortably use a multimedia function.

Another aspect of the present invention is to provide a portable terminal allowing the user to conveniently create a mail or a document.

According to an aspect of the present invention, a portable terminal is provided. The terminal includes a pair of housings and a hinge apparatus for coupling the housings in such a way that the housings pivot with respect to each other in a non-parallel manner. The hinge apparatus includes a hinge bracket fixed to a first housing of the pair of housings, a pivot member connected to a second housing of the pair of housings and pivotably coupled to the hinge bracket to pivot with respect to a hinge axis, a cam surface provided on the pivot member around the hinge axis, the cam surface comprising at least a pair of recess portions, and a cam member received to protrude and retreat in perpendicular to the hinge axis on the hinge bracket. When the pivot member pivots, the cam member slides and contacts the cam surface and is engaged with one of the recess portions on the cam surface, such that at least the housings are folded to each other or are kept stationary in a position where the housings are inclined with respect to each other at a predetermined angle.

The hinge bracket may include a cam hole extending perpendicular to the hinge axis, and the cam member may be received in the cam hole.

The portable terminal may further include a guide member coupled to the pivot member such that the guide member is folded to the first housing or is positioned inclined with respect to the first housing, and a slide member coupled to the second housing and slidably coupled to the guide member, in which when the slide member, together with the second housing, slides on the guide member, a portion of the first housing is opened or closed.

The portable terminal may further include a first pivot hole formed to perforate at an end portion of the hinge bracket, a second pivot hole formed to perforate at an end portion of the pivot member along the hinge axis, and a pivot pin coupled through the first pivot hole and the second pivot hole, in which the pivot member pivots around the hinge axis while being supported by the pivot pin.

The portable terminal may further include guide recesses formed on a rear surface of the second housing, the guide recesses extending in a moving direction of the second housing, inclined surfaces provided in the guide recesses, and interference members formed in the first housing, in which during sliding of the second housing, the interference members are received in the guide recesses, and when a portion of the first housing is opened, the interference members interfere with the inclined surfaces such that the second housing is positioned inclined with respect to the first housing.

The inclined surfaces may be provided on an end portion of the guide recesses.

The interference members may protrude from a surface of the first housing in a region which is closed at all times by the second housing, and extend in a sliding direction of the second housing, such that a protruding height of the interference members decreases towards a portion of the first housing which is opened or closed by the second housing.

The portable terminal may further include one or more magnetic objects installed on a surface of the first housing in a region which is closed at all times by the second housing and metal pieces installed on a side of the second housing, in which when a portion of the first housing is opened, the metal pieces are positioned adjacent to the magnetic objects, thus generating attraction, such that the second housing is positioned inclined with respect to the first housing.

The cam surface may further include an inclined portion and a protruding portion, being provided in an end of the inclined portion with a first recess portion among the recess portions, a second recess portion among the recess portions being disposed adjacent to the first recess portion, and the protruding portion being disposed between the first recess portion and the second recess portion.

When the cam member slides and contacts the inclined portion, the pivot member may pivot in a direction urging the first recess portion to be engaged with the cam member.

The portable terminal may further include a guide member coupled to the pivot member such that the guide member is folded to the first housing or is positioned inclined with respect to the first housing, and a slide member coupled to the second housing and slidably coupled to the guide member, wherein as the slide member, together with the second housing, slides on the guide member, a portion of the first housing is opened or closed.

If a portion of the first housing is opened or closed by a sliding of the second housing, when the first housing is closed, the cam member may be in contact with the inclined portion, and when a portion of the first housing is opened, the pivot member may pivot in a direction urging the first recess portion to be engaged with the cam member as the cam member slides and contacts the inclined portion.

When a portion of the first housing is opened, the cam member may be engaged with the first recess portion, such that the second housing is fixed inclined with respect to the first housing, and the cam member may be engaged with one of the first recess portion and the second recess portion by pivoting of the pivot member, thereby adjusting an inclined angle of the second housing with respect to the first housing.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
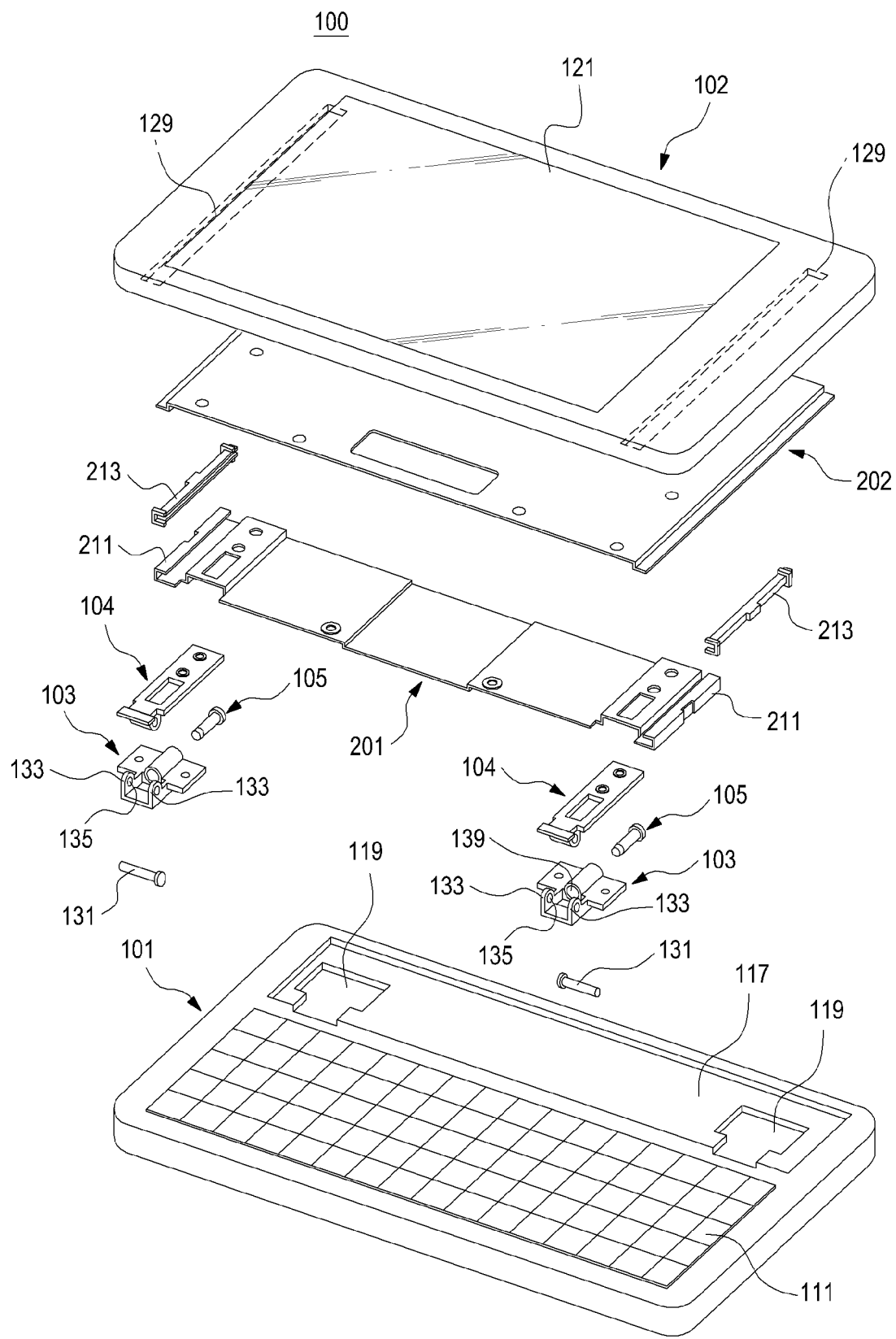
FIG. 1 is an exploded perspective view showing a portable terminal according to an exemplary embodiment of the present invention.
Figure 2:
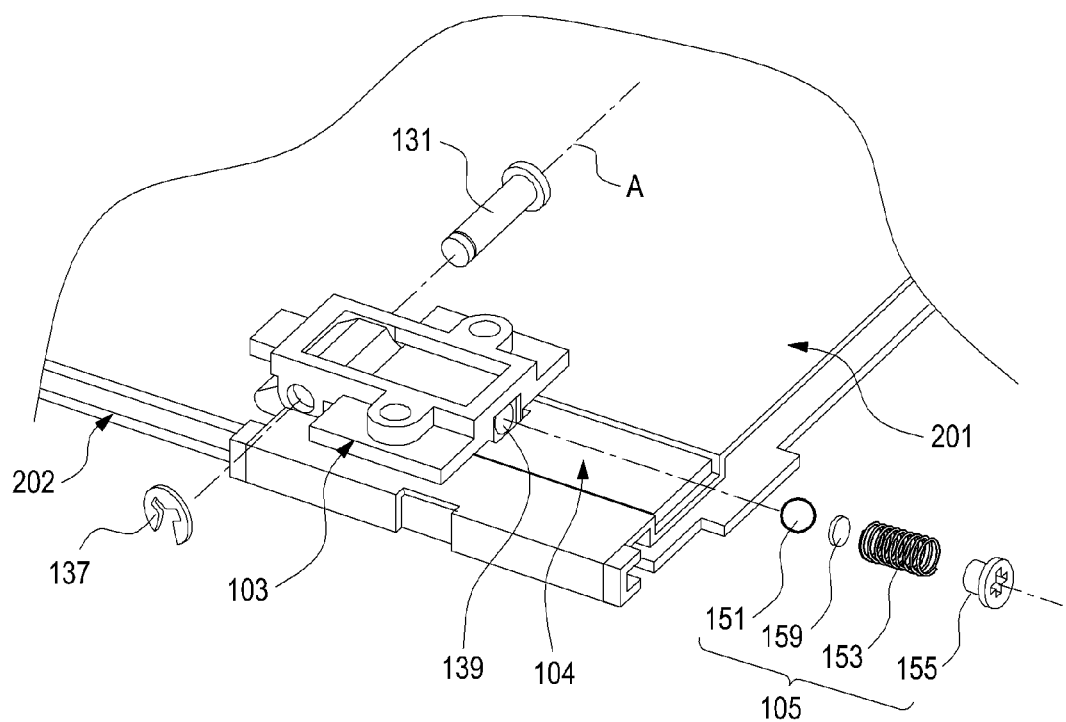
FIG. 2 is a perspective view showing a hinge apparatus of a portable terminal according to an exemplary embodiment of the present invention.
Figure 3:
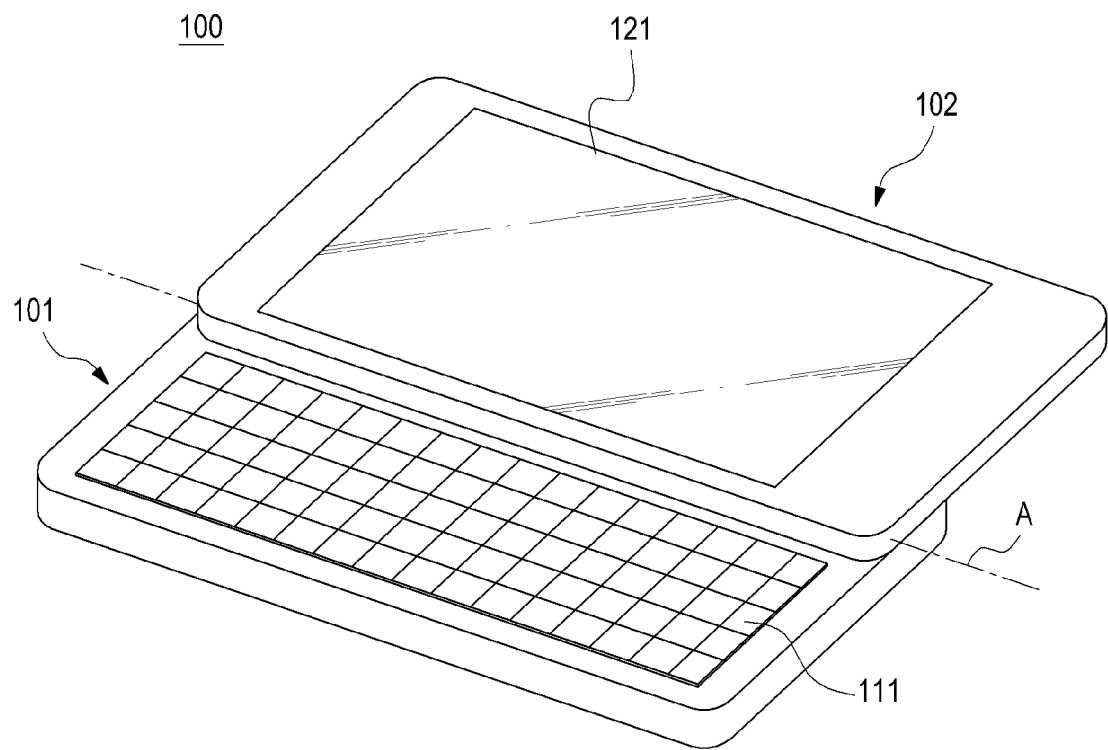
FIG. 3 is a perspective view showing a state where a second housing of a portable terminal slides according to an exemplary embodiment of the present invention.
Figure 4:
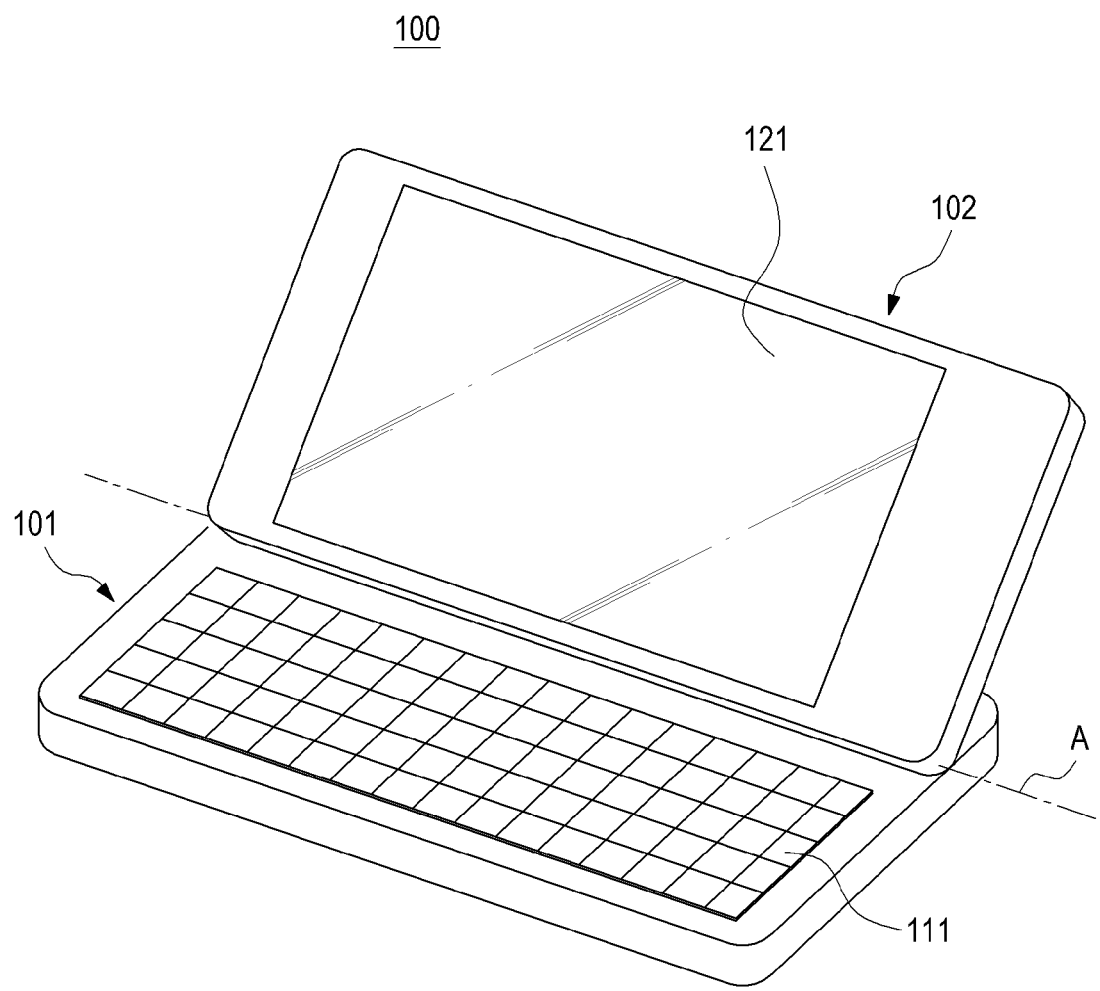
FIG. 4 is a perspective view showing a state where a second housing pivots after sliding according to an exemplary embodiment of the present invention.

FIG. 1 is an exploded perspective view showing a portable terminal according to an exemplary embodiment of the present invention, FIG. 2 is a perspective view showing a hinge apparatus of a portable terminal according to an exemplary embodiment, FIG. 3 is a perspective view showing a state where a second housing of a portable terminal slides according to an exemplary embodiment, and FIG. 4 is a perspective view showing a state where a second housing pivots after sliding according to an exemplary embodiment.

In an exemplary embodiment of the present invention, the hinge apparatus is installed in a sliding-type portable terminal such that the second housing 102 pivots with respect to a first housing 101. However, it can be easily understood by those of ordinary skill in the art that a bar-type portable terminal can also be positioned inclined with respect to the floor by installing a support member, such as in the shape of a flat board or a bar, by means of the hinge apparatus.

Referring to FIG. 1, the first housing 101 includes a keypad 111 installed in a first region of a surface thereof, and a receiving recess 117 and a mounting recess 119 formed in a part of the remaining region, that is, a second region of first housing 101. Herein, the first region denotes a region which is opened or closed by sliding of the second housing 102, and the second region denotes a region which is closed at all times regardless of sliding of the second housing 102. The keypad 111 may, for example, include a numeric key arrangement such as a general keypad of a mobile communication terminal or a QWERTY arrangement such as a keyboard of a Personal Computer (PC). In the current exemplary embodiment, the second housing 102 slides in a widthwise direction of the first housing 101 and in an opened state of the keypad 111, manipulation may be facilitated by positioning the portable terminal 100 in a horizontal orientation. Therefore, the keypad 111 of this exemplary embodiment includes a QWERTY arrangement.

The receiving recess 117 for receiving a guide member 201 to be described below is formed to be recessed to a predetermined depth from a surface of the first housing 101. The mounting groove 119 provides a space for mounting a hinge bracket 103 of the hinge apparatus to be described below. That is, the receiving recess 117 is formed to have a shape corresponding to the guide member 201, and the mounting recess 119 is formed to have a shape corresponding to the hinge bracket 103. At least a part of the mounting recess 119 is preferably recessed from a bottom surface of the receiving recess 117. Since the receiving recess 117 and the mounting recess 119 are located within the second region, they are always closed by the second housing 102.

On a surface of the second housing 102 is installed a display device 121. When the display device 121 is manufactured to have a touch screen panel, the portable terminal can be configured such that a user can execute a menu implemented through the display device 121 even when the keypad 111 is closed by the second housing 102. Although not shown in the figures, a transmitting portion (or mouthpiece) and a receiving portion (or earpiece) used for a voice communication function may be installed at sides of the display device 121.

The second housing 102 is coupled to the first housing 101 through a slide member 202, the guide member 201, a pivoting member 104, and the hinge bracket 103. The sliding member 202 and the guide member 201 guide a sliding of the second housing 102, and the pivot member 104 and the hinge bracket 103 allow the second housing 102 to pivot with respect to the first housing 101.

Referring to FIG. 2, the hinge bracket 103 is mounted in the first housing, more specifically in the mounting recess 119, and includes a cam hole 139 which extends perpendicular to a hinge axis A extending in a lengthwise direction of the first housing 101. Moreover, at an end portion of the hinge bracket 103 is formed a first pivot hole 135 perforating along the hinge axis A. At the end portion of the hinge bracket 103 are also formed support members 133 which face each other, and the first pivot hole 135 is formed in each of the support members 133. An end of the cam hole 139 is positioned between the support members 133, and another end of the cam hole 139 is positioned at an opposite end portion of the hinge bracket 103. A portion where the cam hole 139 is formed is flat to provide an engaging means for fixation onto the first housing 101.

The pivot member 104 is pivotably coupled between the support members 133 at an end thereof. That is, the support members 133 are coupled with the pivot member 104 in such a way as to cover both sides of an end of the pivot member 104. Although not indicated by a reference numeral, a second pivot hole is formed in the end of the pivot member 104 to be aligned on a straight line extending from the first pivot hole 135, more specifically on the hinge axis A. When the first pivot hole 135 and the second pivot hole are aligned with each other, a pivot pin 131 is coupled to the first pivot hole 135 and the second pivot hole by passing through the support member 133 on a side of the hinge bracket 103, the pivot member 104, and then the support member 133 on another side of the hinge bracket 103. An end of the pivot pin 131 has a larger diameter than the other portions of the pivot pin 131 to be supported by the support member 133 on a side of the hinge bracket 103, and another end of the pivot pin 131 is coupled with an engaging member such as an E-ring 137 to bind the pivot pin 131 to the support member 133. Thus, the pivot member 104 is coupled to the hinge bracket 103 in a way so as to pivot around the hinge axis A.

In the cam hole 139 may be installed a cam member 105 which includes a ball plunger 151, an elastic member 153, and an engaging member such as a screw 155. An end of the elastic member 153 is supported by the ball plunger 151, and another end of the elastic member 153 is supported by the screw 155. The screw 155 is engaged with the hinge bracket 103, more specifically another end of the cam hole 139, to prevent the elastic member 153 from leaving the cam hole 139. The ball plunger 151 is provided with an elastic force of the elastic member 153, such that a portion of the ball plunger 151 protrudes from an end of the cam hole 139.

To install the cam member 105, the ball plunger 151 and the elastic member 153 are sequentially inserted into another end of the cam hole 139 and then the screw 155 is engaged, and in this respect, the cam member 105 is easy to assemble.

Figure 5:
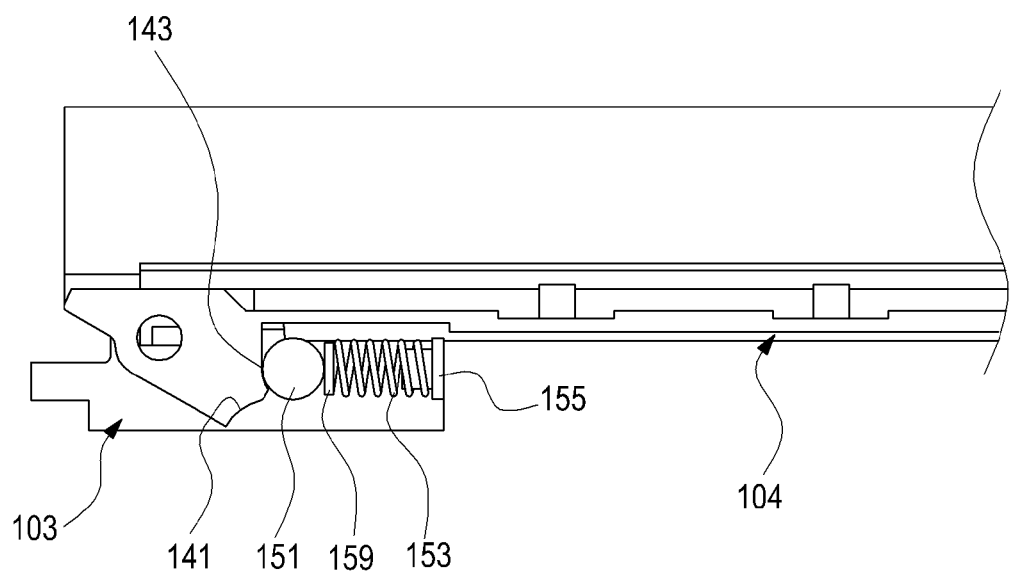
FIG. 5 is a side view showing a hinge apparatus of a portable terminal according to an exemplary embodiment of the present invention.
Figure 6:
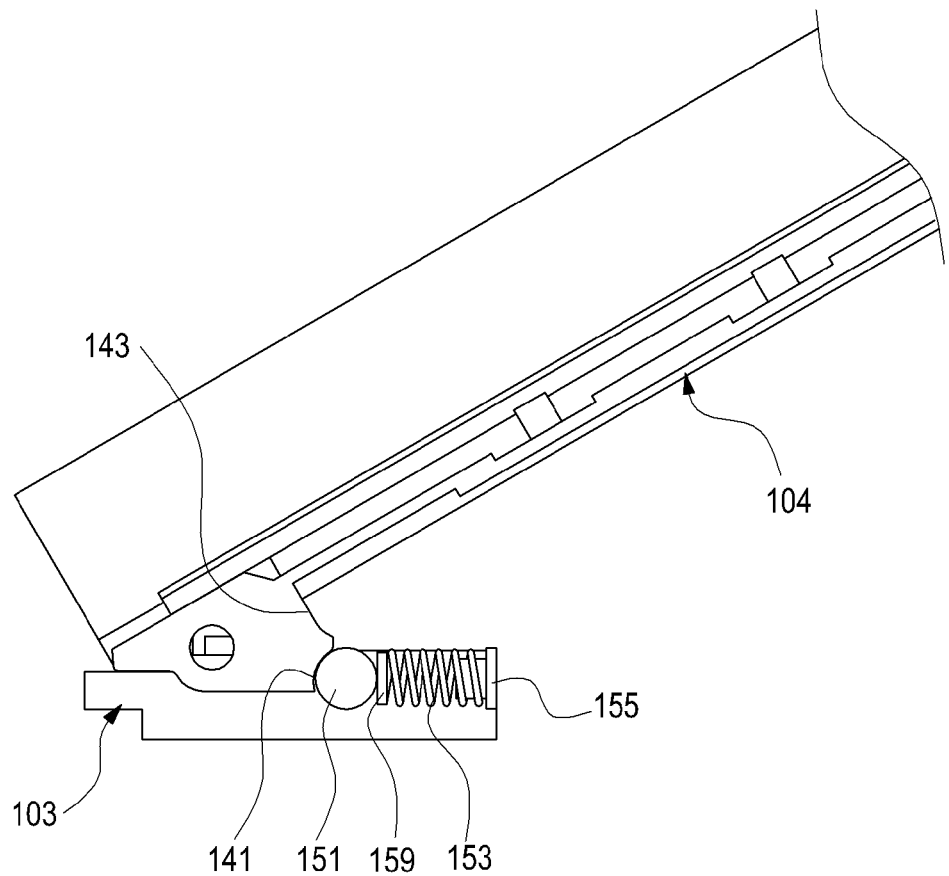
FIG. 6 is a side view showing a hinge apparatus according to an exemplary embodiment of the present invention.

FIG. 5 is a side view showing a hinge apparatus of a portable terminal according to an exemplary embodiment of the present invention. FIG. 6 is a side view showing a hinge apparatus according to an exemplary embodiment of the present invention.

Referring to FIGS. 5 and 6, at an end portion of the pivot member 104, a cam surface including a first recess portion 141 and a second recess portion 143 extends in a circumferential direction spaced apart from the hinge axis A. When the pivot member 104 is coupled to the hinge bracket 103, the cam surface faces an end of the cam hole 139. Once both the pivot member 104 and the cam member 105 are installed in the hinge bracket 103, the portion of the ball plunger 151 which protrudes from the end of the cam hole 139 contacts the cam surface. Thus, upon pivoting of the pivot member 104, the ball plunger 151 slides and contacts the cam surface and may rotate occasionally. To prevent occurrence of unnecessary friction between the ball plunger 151 and the elastic member 153 due to the rotation, a washer 159 may be disposed between the ball plunger 151 and the elastic member 153.

Meanwhile, if the pivot member 104, while pivoting, contacts the protruding portion of the cam surface between the first recess portion 141 and the second recess portion 143, the ball plunger 151 retreats to an inner side of the cam hole 139. That is, the ball plunger 151 protrudes and retreats, that is, performs reciprocating movement within the cam hole 139.

FIG. 5 shows a state where the pivot member 104 is completely folded onto the hinge bracket 103 according to an exemplary embodiment of the present invention. In this state, the ball plunger 151 is engaged with the second recess portion 143, such that the pivot member 104 can maintain a stable stop position. The ball plunger 151 is positioned on an inclined surface without being completely engaged with the second recess portion 143, thereby providing a force working in a direction urging the second housing 102 to closely contact the second region. Consequently, the second housing 102 can maintain parallelism with the first housing 101 more stably.

FIG. 6 shows a state where the pivot member 104 is inclined with respect to the hinge bracket 103 by pivoting according to an exemplary embodiment of the present invention. In this state, the ball plunger 151 is engaged with the first recess portion 141 to maintain the pivot member 104 inclined with respect to the hinge bracket 103.

In the portable terminal 100 structured as described above, when the first housing 101 and the second housing 102 are folded closed with respect to each other, the second housing 102 can only slide. This is because the hinge axis A is adjacent to the first region and is positioned on the second region, such that the first housing 101 interferes with both side ends of the second housing 102 at both sides of the hinge axis A. In other words, when the first housing 101 and the second housing 120 are folded closed with respect to each other, the first housing 101 interferes with both sides of the second housing 102 and thus the second housing 102 cannot pivot around the hinge axis A. For pivoting of the second housing 102, the first housing 101 should not interfere with at least one side of the second housing 102.

Once the second housing 102 completes sliding on the first housing 101, a region where the keypad 111 is installed is opened. During sliding of the second housing 102, a side end of the second housing 102 sliding on the keypad 111 may be positioned on the hinge axis A. When the side end of the second housing 102 is positioned on the hinge axis A, the second housing 102 is positioned in the second region side with respect to the hinge axis A and thus the keypad 111 is completely opened. Consequently, the second housing 102 can pivot with respect to the side end thereof positioned on the hinge axis A.

When the second housing 102 is positioned inclined with respect to the first housing 101, the display device 121 is positioned inclined with respect to a horizontal surface in spite of placement of the portable terminal 100 on the surface, such that the user can comfortably enjoy viewing broadcasting or a moving image file. Moreover, when the user creates a mail or a document by using the portable terminal 100, the screen display direction of the display device 121 can be adjusted adaptively to the user's viewpoint.

Figure 7:
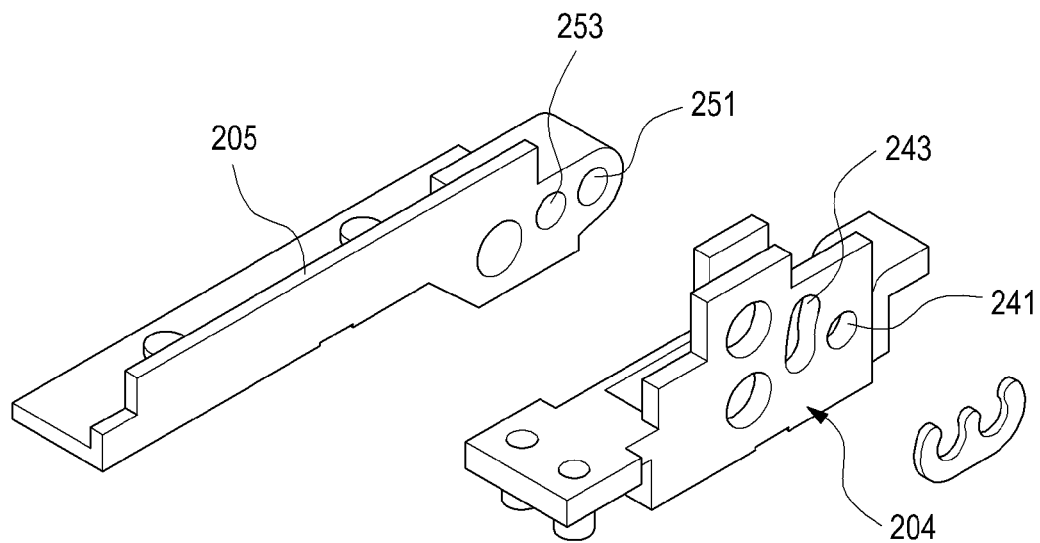
FIG. 7 is an exploded perspective view showing a form of a hinge apparatus according to an exemplary embodiment of the present invention.
Figure 8:
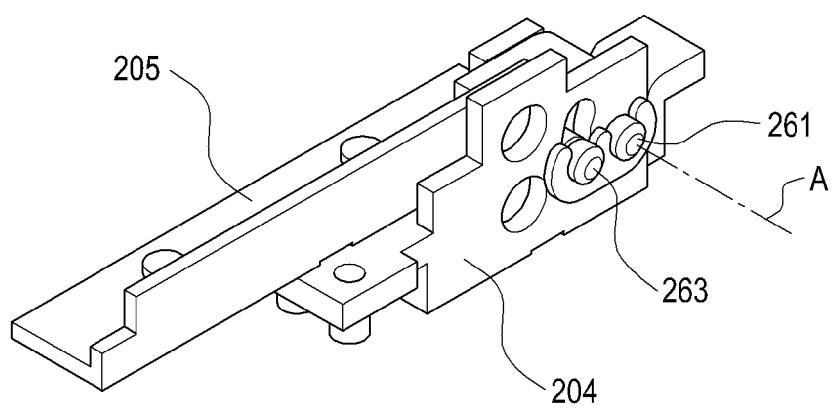
FIG. 8 is a perspective view showing a hinge apparatus according to an exemplary embodiment of the present invention.
Figure 9:
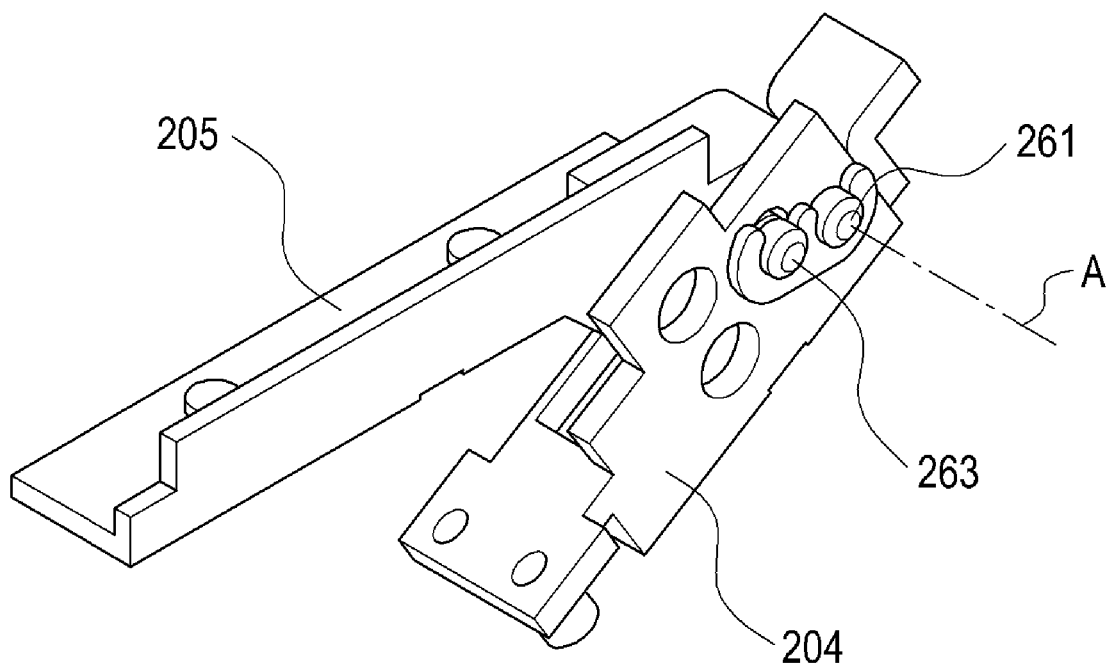
FIG. 9 is a perspective view showing a state where a pivot member of a hinge apparatus pivots according to an exemplary embodiment of the present invention.

FIG. 7 is an exploded perspective view showing a form of a hinge apparatus according to an exemplary embodiment of the present invention. FIG. 8 is a perspective view showing a hinge apparatus according to an exemplary embodiment of the present invention. FIG. 9 is a perspective view showing a state where a pivot member of a hinge apparatus pivots according to an exemplary embodiment of the present invention.

Referring to FIGS. 7-9, the hinge apparatus is different from the hinge apparatus according to the previous embodiment in that guide holes 243 and 253 are formed in a hinge bracket 204 and a pivot member 205, respectively. Although not shown in FIGS. 7 through 9, the cam surface or the cam member according to the previous embodiment may also be installed in the hinge apparatus according to the current exemplary embodiment.

It should be noted that in the description of the current embodiment, a structure that can be easily understood through the previous embodiment is not given a reference numeral in the drawings.

The hinge bracket 204 includes a first pivot hole 241 and the first guide hole 243 which are formed in a pair of facing support members, respectively. When the hinge bracket 204 is installed in the first housing 101, the first pivot hole 241 is positioned on the hinge axis A. The first guide hole 243, formed spaced apart from the first pivot hole 241, is a long hole extending in a curved shape along a circumferential direction with respect to the hinge axis A.

The pivot member 205 includes a second pivot hole 251 and the second guide hole 253. When the pivot member 205 is coupled with the hinge bracket 204 in such a way that both sides of the pivot member 205 are covered with the support members, the second pivot hole 251 is aligned with the first pivot hole 241 on a straight line and a pivot pin 261 is coupled and engaged through the first pivot hole 241 and the second pivot hole 251 to bind the pivot member 205 to the hinge bracket 204. To the first guide hole 243 and the second guide hole 253 is coupled a guide pin 263 which is fixed to the second guide hole 253 and at least an end of which is positioned within the first guide hole 243. Once the pivot member 205 pivots around the hinge axis A, the guide pin 263 revolves around the hinge axis A within the first guide hole 243. At this time, if an inner wall of any one of both ends of the first guide hole 243 interferes with the guide pin 263, the pivot member 205 stops revolving. In other words, the pivot member 205 can pivot within an extending length of the first guide hole 243.

In the hinge apparatus of the portable terminal 100 structured as described above, the pivot range of the pivot member 205 can be limited using the guide pin 263, the first guide hole 243, and the second guide hole 253, and the pivoting of the pivot member 205 can be stabilized by guiding the guide pin 263 along the first guide hole 243.

The guide member 201 is fixed in the first housing in case of a general slide-type terminal of the related art; whereas in exemplary embodiments of the present invention, the guide member 201 is fixed in the pivot member 104, thus being folded onto the first housing 101 or positioned inclined with respect to the first housing 101 by pivoting of the pivot member 104. When folded onto the first housing 101, the guide member 201 is positioned within the receiving recess 117.

The slide member 202 is fixed onto another surface of the second housing 102 in such a way that both side ends thereof are covered with the guide member 201 to slide. As the slide member 202 slides by being guided by the guide member 201, the second housing 102 may also slide with respect to the first housing 101. Meanwhile, the guide member 201 includes guide ribs 211 which are bent at both side ends thereof to cover both side ends of the slide member 202. In each of the inner sides of the guide ribs 211 may be installed a lubricating member 213 for alleviating a frictional force and preventing noise caused by sliding between the guide ribs 211 and the slide member 202. The lubricating member 213 may, for example, be made of synthetic resin such as PolyOxyMethylene (POM) or acetal which has superior abrasion resistance and lubricative property.

Since the guide ribs 211 cover the slide member 202, a portion thereof may directly contact another surface of the second housing 102. To prevent friction from being generated as the guide ribs 211 directly contact another surface of the second housing, avoiding grooves 129 may be formed in another surface of the second housing 102. The avoiding grooves 129 extend in the sliding direction of the second housing 102 and receive the portion of the guide ribs 211.

Although not shown in the drawings, another elastic member may be installed between the guide member 201 and the slide member 202 to provide a driving force for sliding the slide member 202. The elastic member which provides the driving force for sliding the slide member 202 may, for example, use a coil and a torsion spring which includes free ends extending from both ends of the coil in a direction away from each other. During sliding of the slide member 202, the torsion spring operates, such that the free ends thereof move close to or away from each other, and the coil provides an elastic force in a direction urging the free ends away from each other. Such an operation of the torsion spring can be easily understood by those of ordinary skill in the art, and may be substituted by various forms of an elastic member, such as a wire spring in a zigzag shape.

Thus, the second housing 102 is coupled to the first housing 101 to slide in the widthwise direction of the first housing 101, and can pivot around the hinge axis A when the keypad 111 is opened, thereby being positioned inclined with respect to the first housing 101 as illustrated in FIG. 4.

Figure 10:
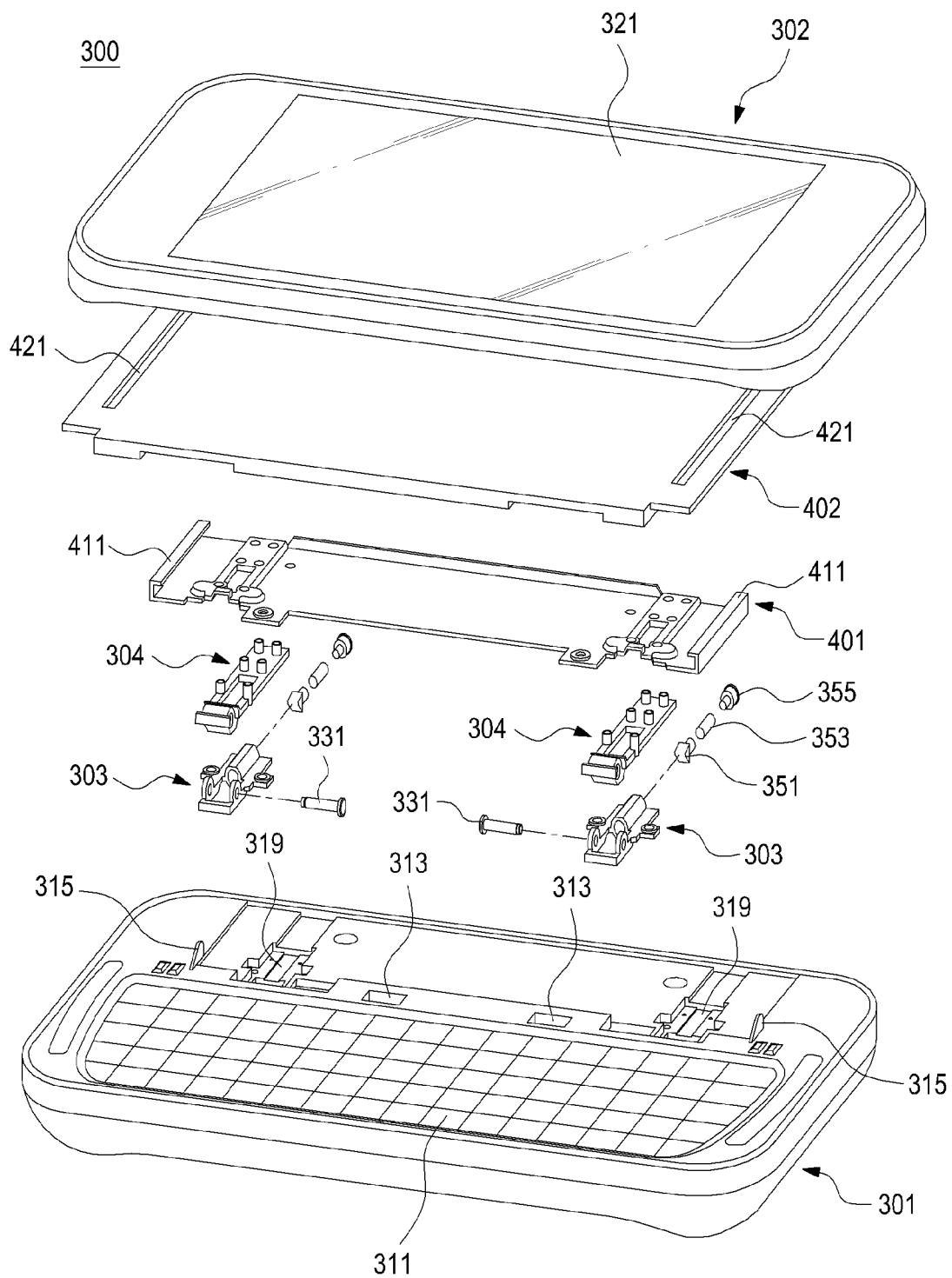
FIG. 10 is an exploded perspective view showing a portable terminal according to an exemplary embodiment of the present invention.
Figure 11:
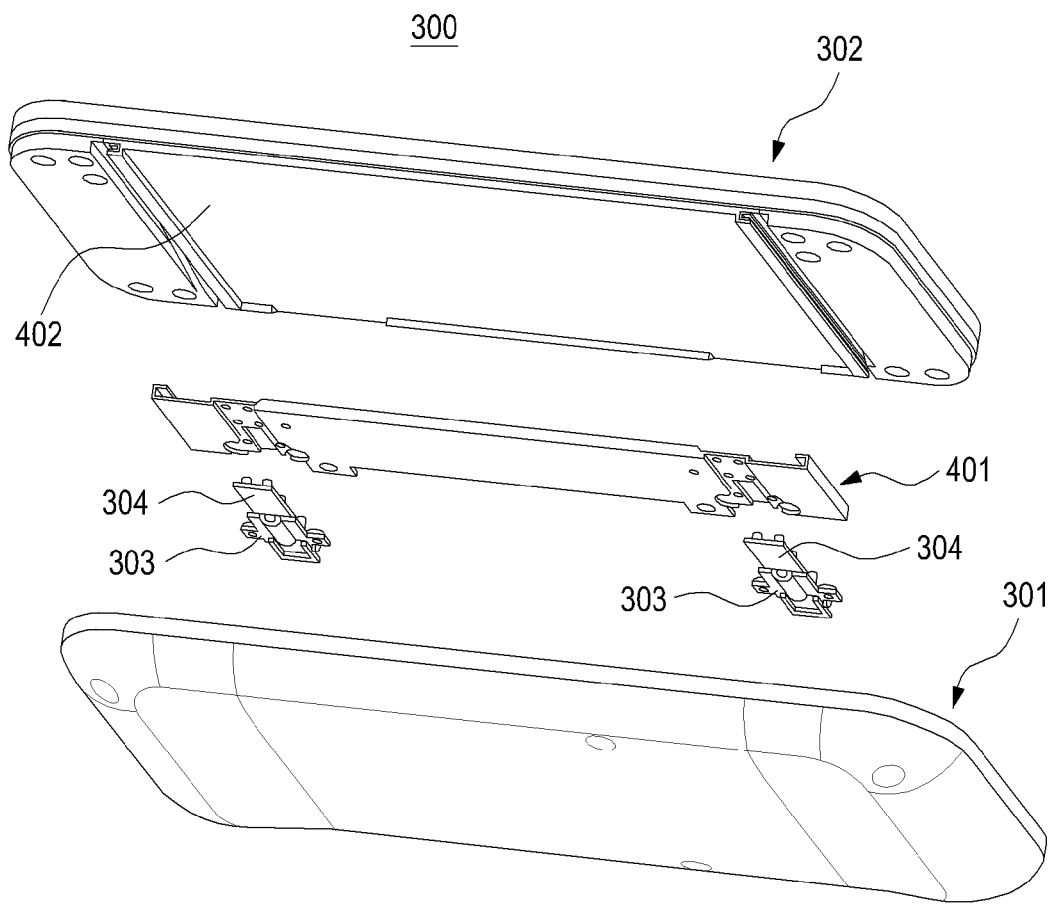
FIG. 11 is an exploded perspective view of a portable terminal which is viewed from another direction according to an exemplary embodiment of the present invention.

FIG. 10 is an exploded perspective view showing a portable terminal according to an exemplary embodiment of the present invention. FIG. 11 is an exploded perspective view of a portable terminal which is viewed from another direction according to an exemplary embodiment of the present invention.

Referring to FIGS. 10 and 11, the portable terminal 300 according to the current exemplary embodiment of the present invention is structured in a similar manner to the previous exemplary embodiment except that when a first region of a first housing 301 where a keypad 311 is installed is opened by sliding of a second housing 302, the second housing 302 is automatically positioned inclined with respect to the first housing 301. Therefore, a structure that can be easily understood by the previous embodiment will not be described in detail.

Figure 15:
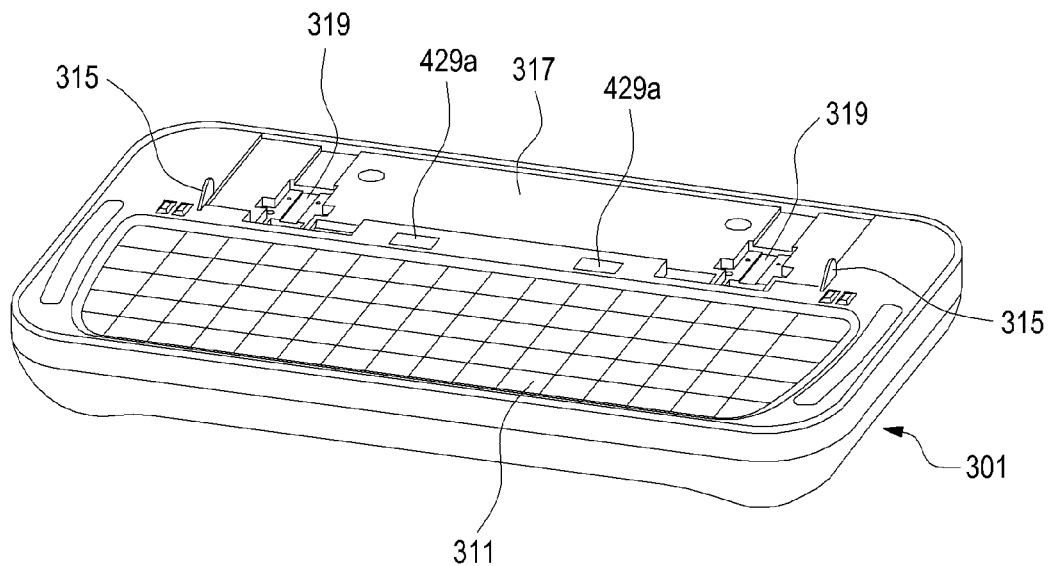
FIG. 15 is a perspective view showing a first housing of a portable terminal according to an exemplary embodiment of the present invention.

FIG. 15 is a perspective view showing a first housing of a portable terminal according to an exemplary embodiment of the present invention.

Referring also to FIG. 15, as in the previous exemplary embodiment, in the first housing 301, the keypad 311 is installed in the first region which is opened or closed by sliding of the second housing 302, and a receiving recess 317 and a mounting recess 319 are formed in a second region that is always closed regardless of sliding of the second housing 302. Unlike in the previous exemplary embodiment, interference members 315 are formed in the second region of the first housing 301. The interference members 315 protrude from a surface of the first housing 301 in the second region and extend in the sliding direction of the second housing 302, such that the protruding height of the interference member 315 decreases towards the first region. In the second region are installed magnetic objects 429a (shown in FIGS. 15 and 19). To install the magnetic objects 429a, a pair of holes 313 are formed in a position in the second region, which is adjacent to the first region. As shown in FIG. 15, the magnetic objects 429a are installed in the holes 313, respectively.

Figure 12:
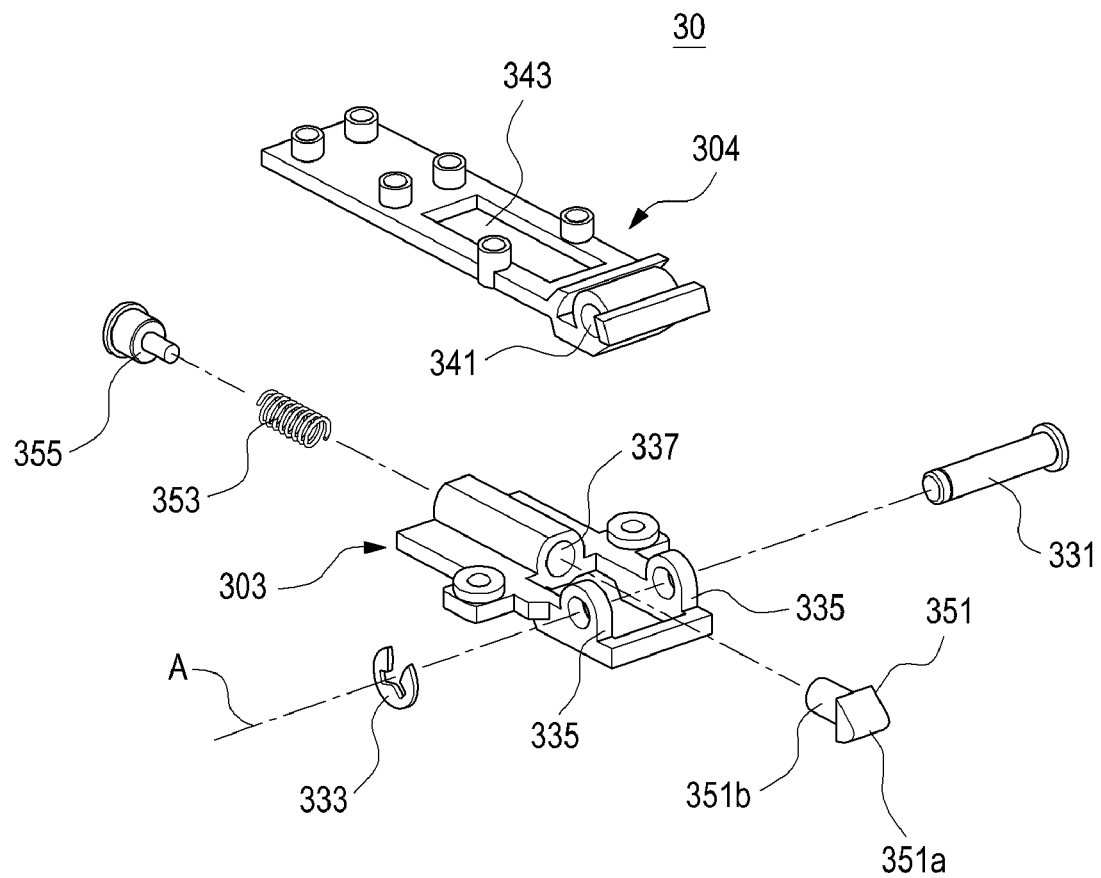
FIG. 12 is an exploded perspective view showing a hinge apparatus of a portable terminal according to an exemplary embodiment of the present invention.

A hinge bracket 303 of a hinge apparatus 30 shown in more detail in FIG. 12 is fixed to a mounting recess 319, and a pivot member 304 of the hinge apparatus 30 is pivotably coupled to the hinge bracket 303. A pivot pin 331 is coupled through a support member 335 formed in the hinge bracket 303 and a pivot hole 341 formed in the pivot member 304, such that the pivot member 304 is coupled to the hinge bracket 303 and pivots around a hinge axis A. The hinge axis A is oriented in the extending direction of the pivot pin 331. An end of the pivot pin 331 is supported by an outer side of the support member 335 at a side, and another end of the pivot pin 331 protrudes from an outer side of the support member 335 at another side and is bound by an engaging member 333 such as an E-ring.

Figure 13:
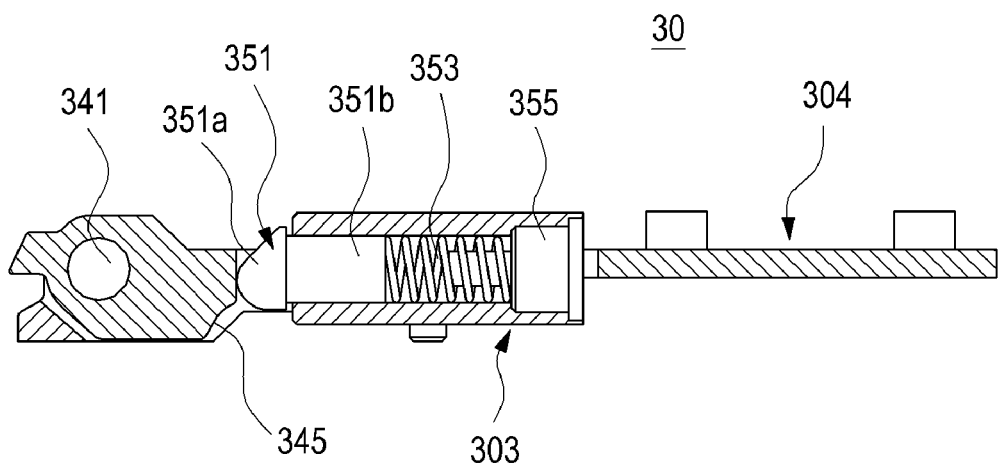
FIG. 13 is a side view showing a state before a hinge apparatus pivots according to an exemplary embodiment of the present invention.
Figure 14:
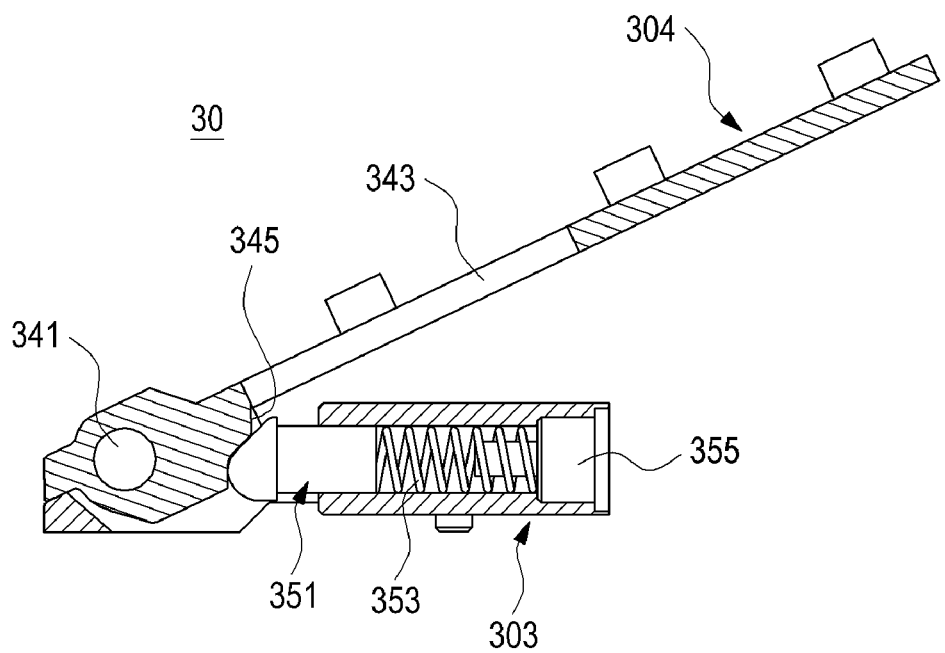
FIG. 14 is a side view showing a state after a hinge apparatus pivots according to an exemplary embodiment of the present invention.

A cam hole 337 extending perpendicular to the hinge axis A is formed in the hinge bracket 303, and a cam surface (345 of FIGS. 13 and 14) facing the cam hole 337 is formed in the pivot member 304. Once the pivot member 304 pivots, a portion of the cam surface 345 faces the cam hole 337. A plunger 351, an elastic member 353, and a support screw 355 are installed in the cam hole 337, and the elastic member 353 is positioned between the plunger 351 and the support screw 355 to provide an elastic force urging the plunger 351 to closely contact the cam surface 345. While a ball plunger is used in the previous exemplary embodiment, the plunger 351 in the current exemplary embodiment includes a support portion 35 lb supported by the elastic member 353 and a cam portion 351a formed as a one-piece unit with the support portion 351b. When the pivot member 304 closely contacts the hinge bracket 303 before pivoting through a formed avoiding hole 343, a protruding portion of hinge bracket 303 for forming the cam hole 337 may be received in the formed avoiding hole 343 of pivot member 304.

Once the pivot member 304 pivots, the cam surface 345 slides and contacts the plunger 351, more specifically the cam portion 351a. In particular positions of the cam surface 345 are formed recesses for engagement with the cam portion 351a. The cam portion 351a is engaged with one of the recesses formed in the cam surface 345, such that the second housing 302 is kept parallel with the first housing 301, or is kept inclined with respect to the first housing 301 when the first housing 301 is opened.

The pivot member 304 to which a guide member 401 is fixed pivots with respect to the first housing 301. Once the hinge apparatus 30 is mounted on both sides in the second region of the first housing 301, the guide member 401 can stably pivot with respect to the first housing 301, together with the pivot member 304. In the guide member 401 may be formed a fixing groove 419 in a particular shape to which the pivot member 304 can be coupled, thereby facilitating assembly with the pivot member 304. The guide member 401 is positioned on the receiving recess 317 prior to pivoting of the pivot member 304, and upon pivoting of the pivot member 304, the guide member 401 is positioned inclined with respect to the first housing 301. At both side ends of the guide member 401 are formed guide ribs 411 bent to face each other.

Figure 16:
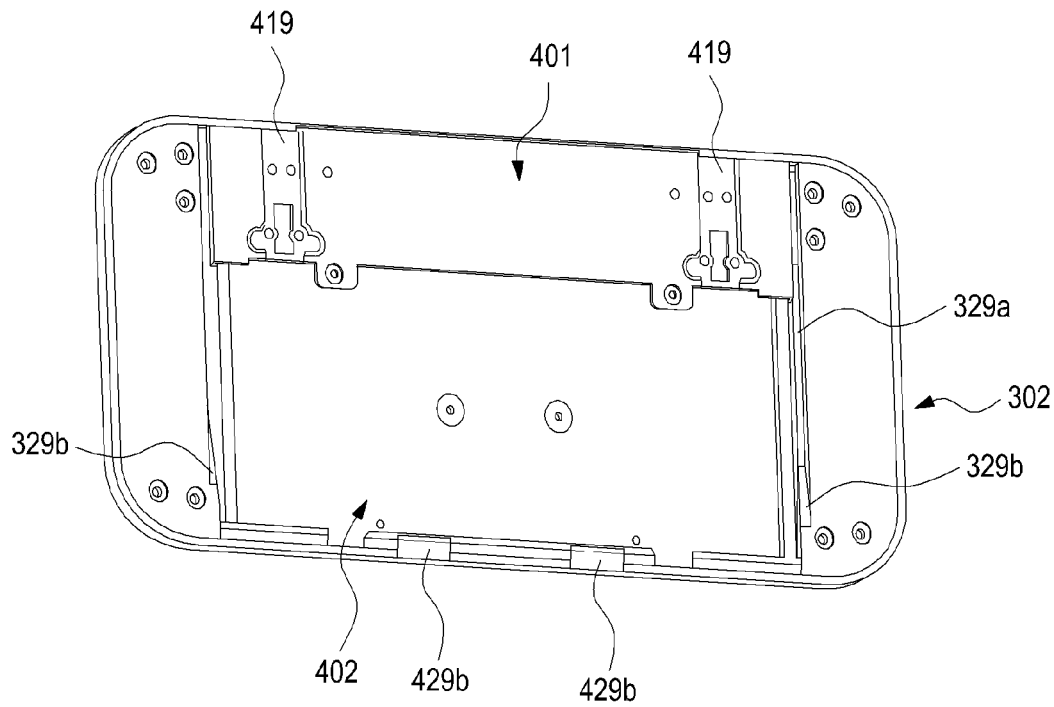
FIG. 16 is a perspective view showing a second housing of a portable terminal according to an exemplary embodiment of the present invention.

A display device 321 is installed on a front surface of the second housing 302 and a slide member 402 is coupled to a rear surface of the second housing 302. The slide member 402 includes a pair of guide slits 421 formed in the sliding direction of the second housing 302. The guide ribs 411 are bound to the slide member 402 through the guide slits 421. Eventually, the second housing 302, together with the slide member 402, is guided by the guide ribs 411, thus being slidably coupled to the guide member 401. In FIG. 16, it is shown that the slide member 402 is coupled to the rear surface of the second housing 302 and the guide member 401 and the slide member 402 are coupled.

On the rear surface of the second housing 302 are formed guide recesses 329a adjacent to both sides of the slide member 402. The guide recesses 329a extend in the sliding direction of the second housing 302, and during sliding of the second housing 302, the guide recesses 329a receive the interference members 315. On end portions of the guide recesses 329a are formed inclined surfaces 329b which the interference members 315 interfere with when the first region is opened by the second housing 302, such that the second housing 302 pivots inclinedly with respect to the first housing 301.

Moreover, metal pieces 429b are installed closely to an edge of a rear surface at a side of the second housing 302. Although the metal pieces 429b are installed at a side of the second housing 302, they may be hidden by painting not to be exposed to the exterior of the portable terminal 300 or may be disposed in an inner wall of a side of the second housing 302. When the keypad 311, that is, the first region of the first housing 301 is opened, the metal pieces 429b are positioned to correspond to the magnetic objects 429a such that the metal pieces 429b tend to move toward a surface of the first housing 301 by attraction with the magnetic objects 429a. By attraction between the magnetic objects 429a and the metal pieces 429b, the second housing 302 can be automatically positioned inclined with respect to the first housing 301 when the first region of the first housing 301 is opened.

Although an elastic member for providing a driving force for sliding the second housing 302 is not depicted in the current exemplary embodiment, an elastic member for providing an elastic force in a direction urging both ends of the elastic member to move away from each other, such as a torsion spring, may be installed between the guide member 401 and the slide member 402. By installing the elastic member between the guide member 401 and the slide member 402, the sliding of the second housing 302 may be implemented semi-automatically.

Figure 17:
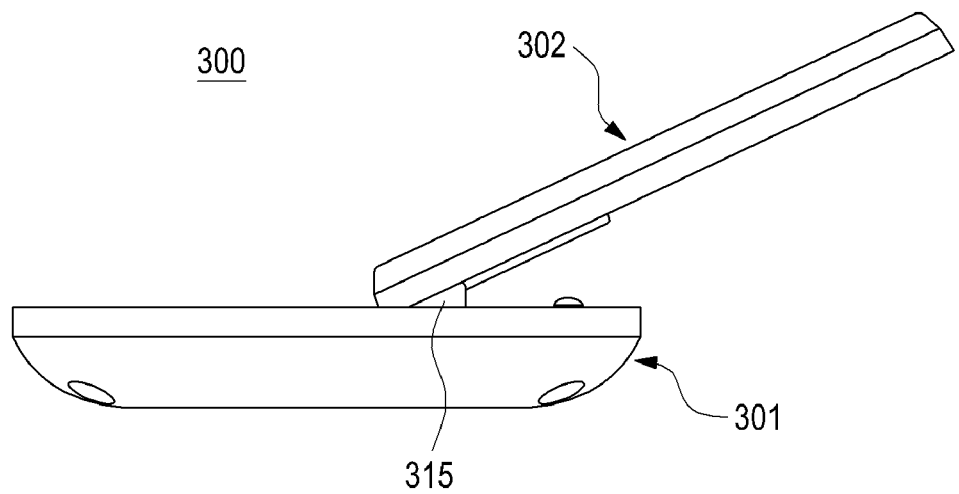
FIG. 17 is a side view showing a state where the second housing of a portable terminal pivots after sliding according to an exemplary embodiment of the present invention.
Figure 18:
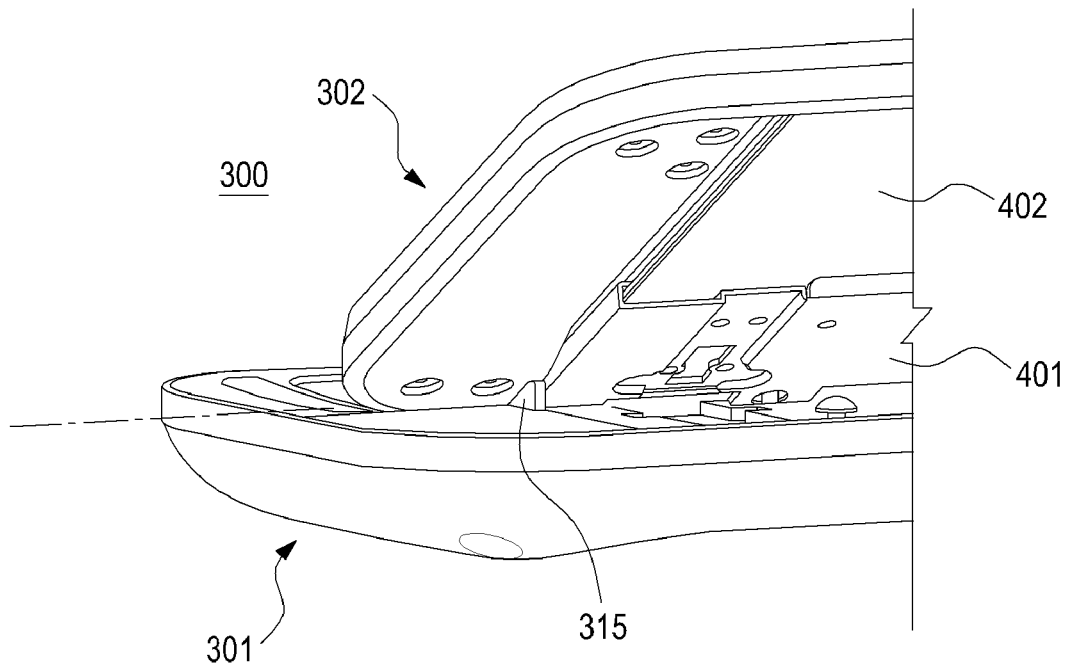
FIG. 18 is a perspective view of a portable terminal which is viewed from a rear side of the second housing according to an exemplary embodiment of the present invention.
Figure 19:
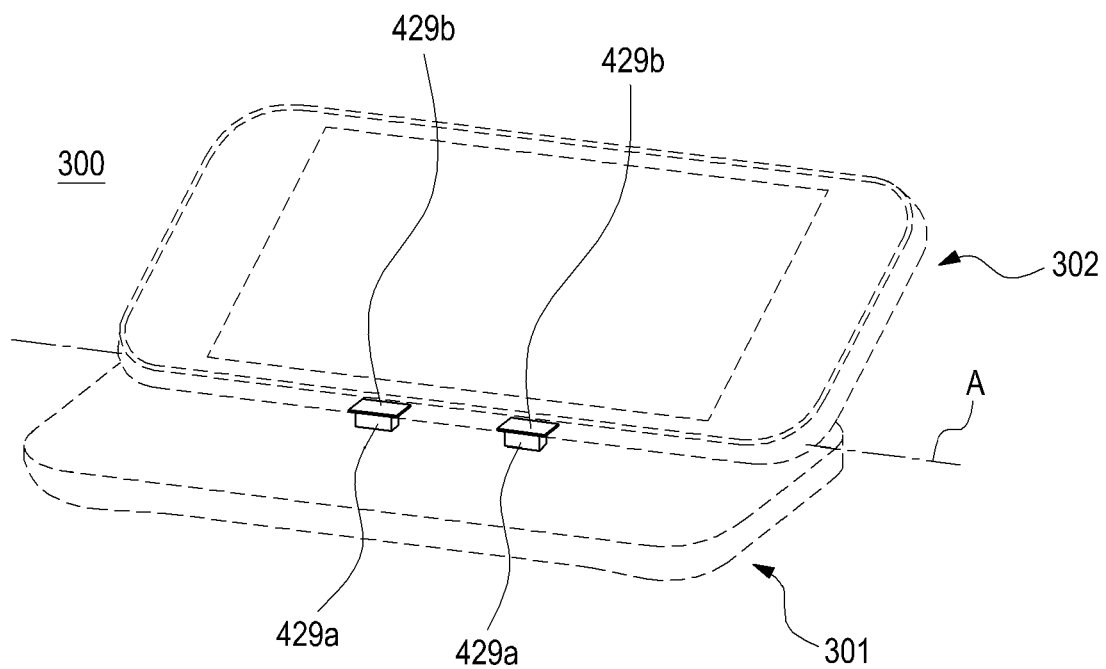
FIG. 19 is a projected perspective view of a portable terminal according to an exemplary embodiment of the present invention.

Therefore, referring to FIGS. 17 through 19, in the portable terminal 300, when the first region is opened, the interference members 315 interfere with the inclined surfaces 329b of the guide recesses 329a, such that the second housing 302 pivots and thus is positioned inclined with respect to the first housing 301. Attraction between the magnetic objects 429a and the metal pieces 429b allows the second housing 302 to be stably kept inclined with respect to the first housing 301, and in this state, by forming the groove for engagement with the cam portion 351a in the cam surface 345, the second housing 302 can be more stably kept inclined with respect to the first housing 301.

Figure 20:
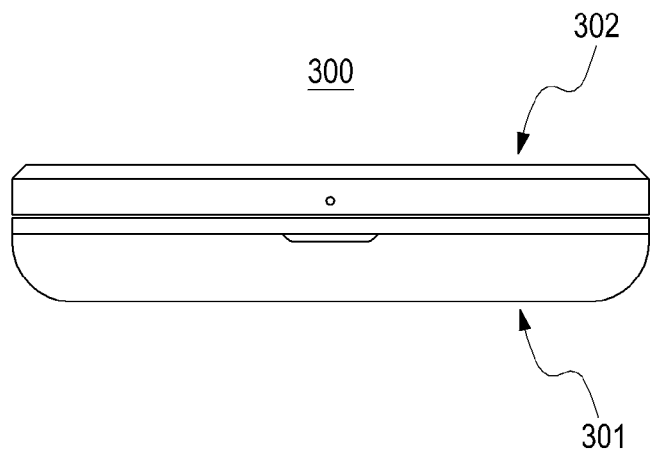
FIG. 20 is a side view of a portable terminal according to another exemplary embodiment of the present invention.
Figure 21:
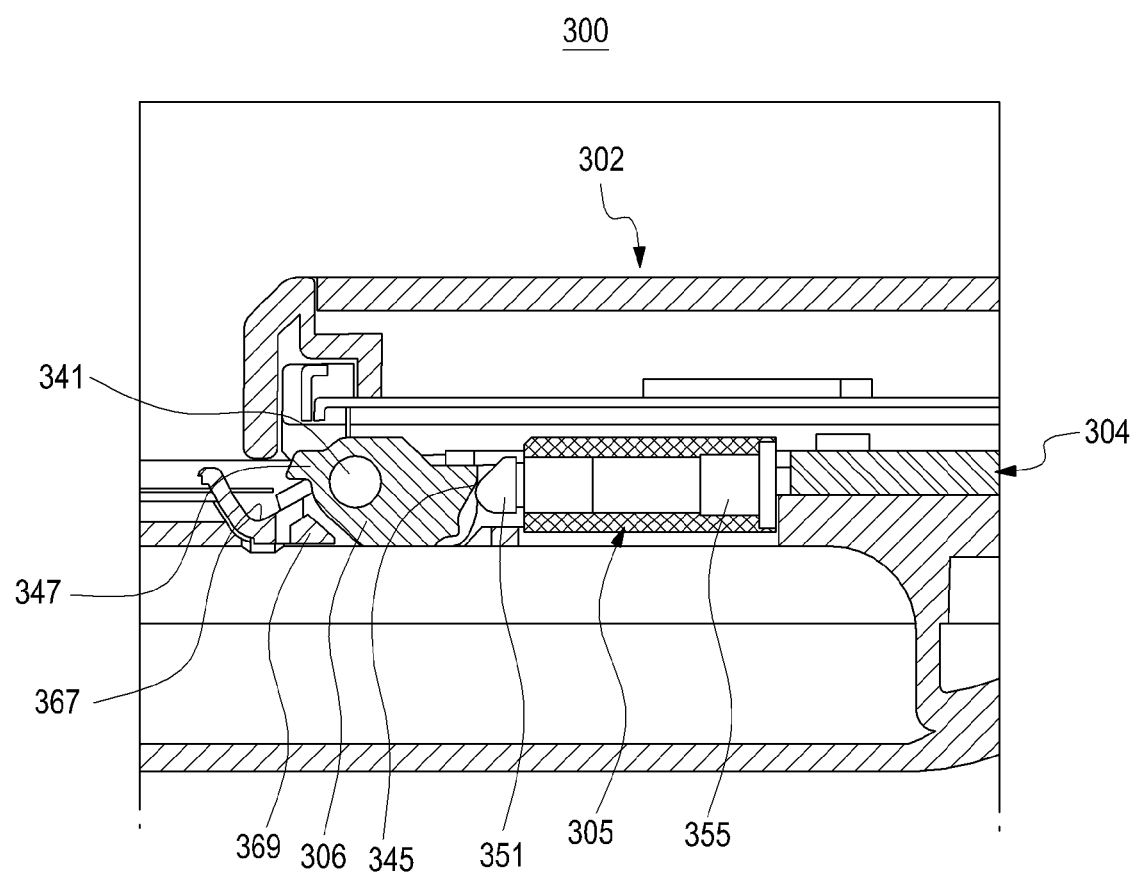
FIG. 21 is a side view of a hinge apparatus of a portable terminal according to another exemplary embodiment of the present invention.
Figure 24:
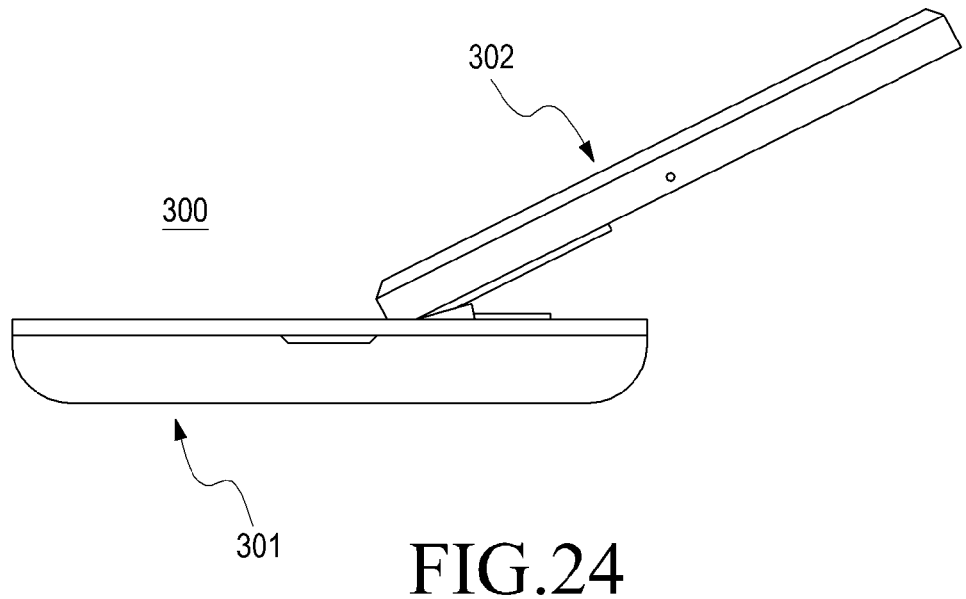
FIG. 24 is a side view showing a state after a second housing of a portable terminal pivots according to another exemplary embodiment of the present invention.
Figure 25:
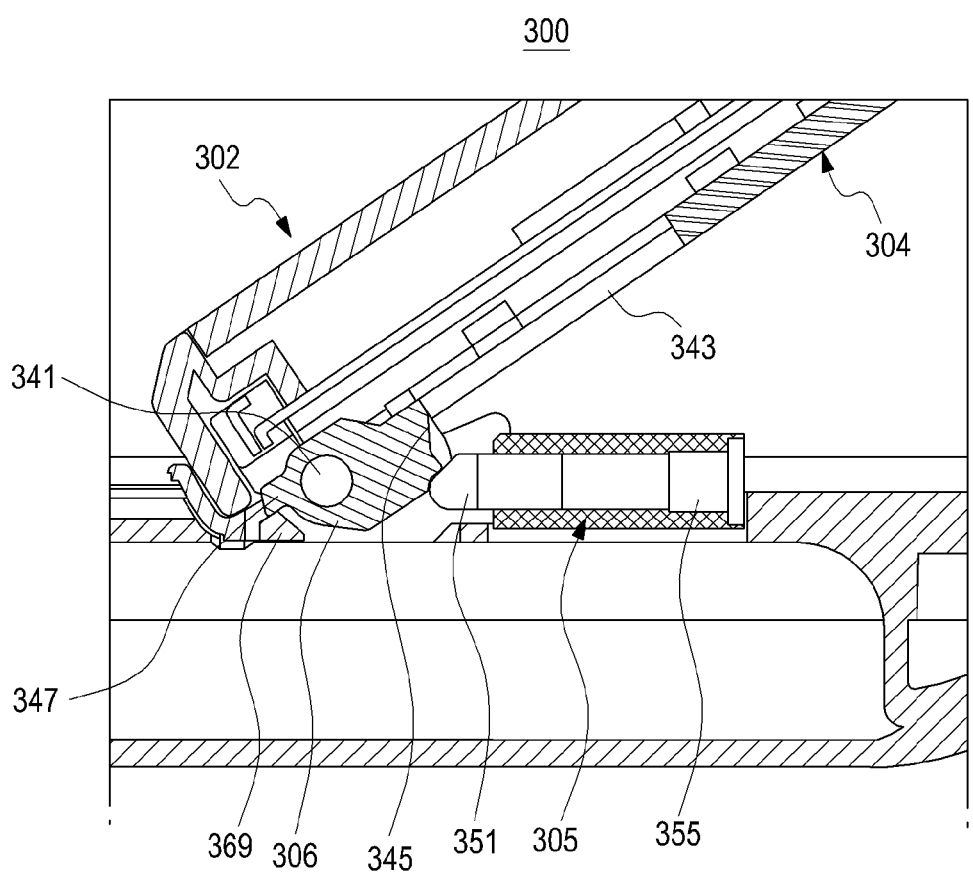
FIG. 25 is a side view showing a hinge apparatus of a portable terminal according to another exemplary embodiment of the present invention.
Figure 26:
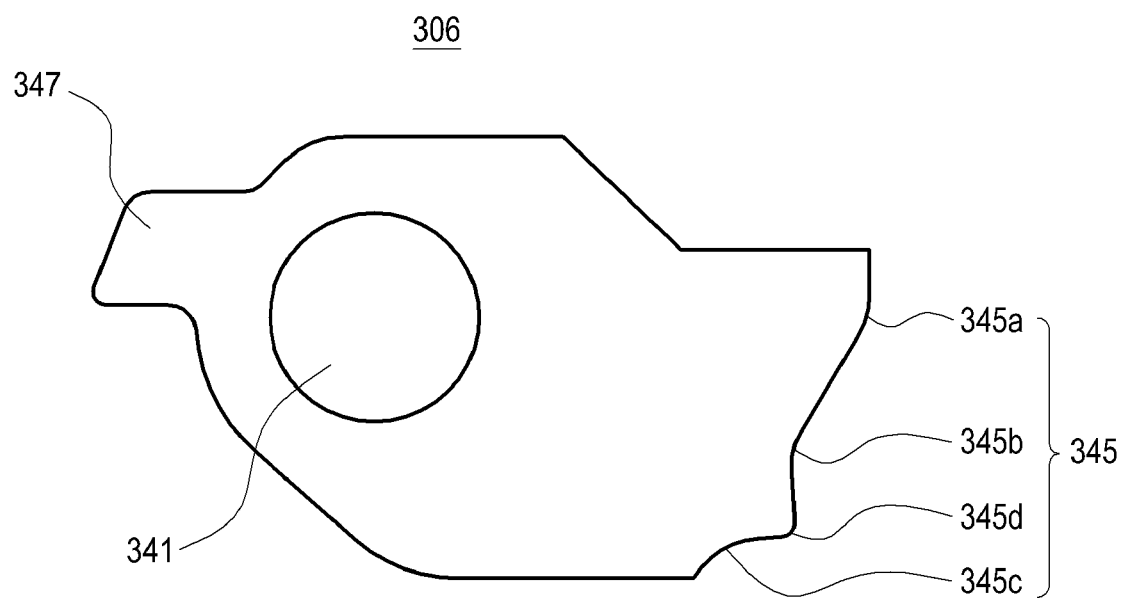
FIG. 26 is a side view showing a hinge member of a hinge apparatus according to another exemplary embodiment of the present invention.

FIGS. 20 through 25 show a portable terminal 300 and a hinge apparatus thereof according to another exemplary embodiment of the present invention, and FIG. 26 is a side view showing a hinge member 306 of the hinge apparatus shown in FIG. 21. The hinge member 306 is provided as a part of the pivot member 304.

The portable terminal 300 according to another exemplary embodiment of the present invention is similar to the portable terminal disclosed in the previous exemplary embodiment shown in FIGS. 10 through 19. However, the current exemplary embodiment is different from the previous exemplary embodiment in terms of the construction of the hinge member 306, shown in FIG. 26, and the stopping construction of the second housing 302 based on pivoting of the pivot member 304. Therefore, it should be noted that in the description of the current exemplary embodiment, constructions which can be easily understood from the previous exemplary embodiments will be given the same reference numerals as used in the previously exemplary embodiments, or will not be given any reference numeral, and descriptions thereof may be omitted.

As shown in FIGS. 20 through 25, the portable terminal 300 of this exemplary embodiment is configured such that the first housing 301 and the second housing 302 are coupled to slide while facing each other, and the second housing 302 may be positioned inclined with respect to the first housing 301 when a portion of the first housing 301 is opened by sliding of the second housing 302. In this state, it is possible to adjust an angle at which the second housing 302 is positioned inclined with respect to the first housing 301.

FIG. 26 is a side view showing a hinge member of a hinge apparatus according to an exemplary embodiment of the present invention.

Referring to FIG. 26, the pivot member 304 which slides and contacts the cam member 305 as the second housing 302 pivots, more specifically, the cam surface 345 of the hinge member 306 includes an inclined portion 345a and a protruding portion 345d. A first recessed portion 345b is disposed at an end of the inclined portion 345a, and a second recessed portion 345c is disposed adjacent to the first recessed portion 345b, such that the protruding portion 345d is positioned between the first recessed portion 345b and the second recessed portion 345c.

An interference protrusion 347 is formed in a position facing the cam surface 345 with respect to the pivot hole 341 of the hinge member 306. The interference protrusion 347 is in a shape extending in a direction away from the pivot hole 341 and protrudes from an outer circumferential surface of the hinge member 306. Upon pivoting of the pivot member 304, the cam surface 345 and the interference protrusion 347 pivot around the pivot hole 341.

FIG. 20 is a side view of a portable terminal according to an exemplary embodiment of the present invention, and FIG. 21 is a side view of a hinge apparatus of a portable terminal according to an exemplary embodiment of the present invention.

Referring to FIGS. 20 and 21, there is shown a state of the first housing 301 closed by the second housing 302. In the closed state of the first housing 301, the cam member 305, and more particularly the plunger 351, is in contact with the inclined portion 345a of the cam surface 345. The plunger 351 is provided with an elastic force from an elastic member working in a direction moving toward the pivot hole 341. The first recess portion 345b and the second recess portion 345c are formed in positions closer to the pivot hole 341 than the inclined portion 345a. Thus, the plunger 351 tends to slide toward the first recess portion 345b when contacting the inclined portion 345a. However, when the first housing 301 is closed, both side ends of the second housing 302, that is, both the left side end and the right side end of the second housing 302, are positioned away from the pivot hole 341 and interfered with by the first housing 301, whereby either the second housing 302 or the pivot member 304 cannot pivot.

Figure 22:
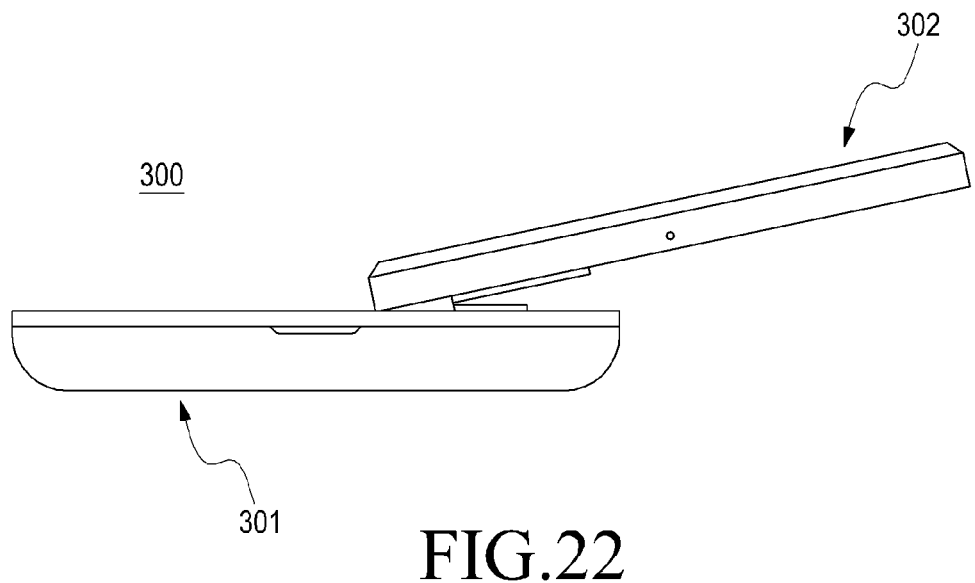
FIG. 22 is a side view showing a state where a second housing of a portable terminal slides according to another exemplary embodiment of the present invention.
Figure 23:
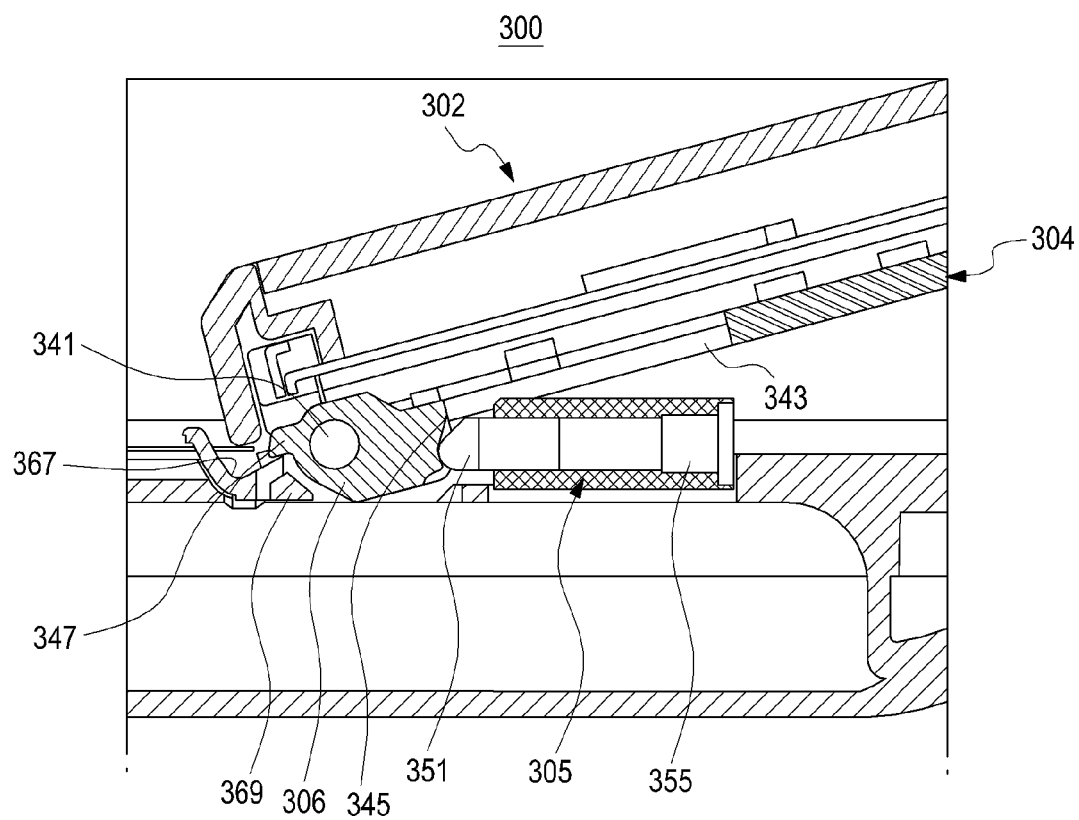
FIG. 23 is a side view showing a hinge apparatus of a portable terminal according to another exemplary embodiment of the present invention.

FIG. 22 is a side view showing a state where a second housing of a portable terminal slides according to an exemplary embodiment of the present invention, and FIG. 23 is a side view showing a hinge apparatus of a portable terminal according to an exemplary embodiment of the present invention.

Referring to FIGS. 22 and 23, there is shown a state where a portion of the first housing 301 is opened by sliding of the second housing 302. Once a portion of the first housing 301 is opened, the left side end of the second housing 302 moves close to the pivot hole 341, such that the second housing 302 and the pivot member 304 can pivot. In this structure, by forming an avoiding space 367 in the first housing 301, the second housing 302 may pivot without being interfered with by the first housing 301. In FIG. 23, the left end portion and lower end portion of the second housing 302 move into the avoiding space 367 on a surface of the first housing 301.

Once the second housing 302 slides to a pivotable position, the cam member 305 contacts the inclined portion 345a and thus urges the hinge member 306, and more particularly the pivot member 304, to pivot. That is, the cam member 305 pressurizes the hinge member 306, such that the hinge member 306 pivots to a position where the first recess portion 345b is engaged with the cam member 305. In this way, the pivot member 304 and the second housing 302 move to positions that are inclined with respect to the first housing 301. Once the cam member 305 is engaged with the first recess portion 345b, the second housing 302 is fixed inclined at a predetermined angle with respect to the first housing 301.

In this state, the interference member 315, the guide recesses 329a, and the inclined surfaces 329b according to the previous exemplary embodiment may be applied to the portable terminal according to the current exemplary embodiment. In other words, by combining the inclined portion 345a and the cam member 305 with the interference member 315, the guide recesses 329a, and the inclined surfaces 329b, the second housing 302 may be positioned inclined with respect to the first housing 301 when the first housing 301 is opened.

FIG. 24 is a side view showing a state after a second housing of a portable terminal pivots according to an exemplary embodiment of the present invention, and FIG. 25 is a side view showing a hinge apparatus of a portable terminal according to an exemplary embodiment of the present invention.

Referring to FIGS. 24 and 25, there is shown a state where an inclined angel of the second housing 302 is adjusted when a portion of the first housing 301 is opened. When the cam member 305 is engaged with the first recess portion 345b, the user may adjust the inclined angle of the first housing 301 by pivoting the second housing 302, if desired. Once the user further pivots the second housing 302, the plunger 351 of the cam member 305 temporarily retreats by being interfered with by the protruding portion 345d and at a position engaged with the second recessed portion 345c, protrudes close to the pivot hole 341. In conclusion, the second housing 302 can maintain a stable stop position when the cam member 305 is engaged with any one of the first recessed portion 345b and the second recessed portion 345c, and the user may adjust the inclined angle of the second housing 302 with respect to the first housing 301 when necessary.

As shown in FIG. 25, when the cam member 305 is engaged with the second recessed portion 345c, the interference protrusion 347 contacts the stop protrusion 369 formed in the first housing 301. Thus, the second housing 302 cannot then pivot farther away from the first housing 301. In addition, the left side end and lower end portion of the second housing 302 closely contact the inner wall of the avoiding space 367 formed in the first housing 301, such that the second housing 302 can then pivot only in a direction toward the first housing 301.

As can be seen from the foregoing description, in the above-described portable terminal including a pair of housings, a housing can be positioned inclined with respect to another housing, such that when the housing is placed on a horizontal surface, another housing can be positioned inclined with respect to the horizontal surface. By installing a display device on the housing positioned inclined with respect to the horizontal surface, a user can comfortably enjoy a multimedia function. Moreover, the user, while manipulating the portable terminal, can adjust the screen display direction of the display device in the direction of user's viewpoint, thus conveniently creating a mail or a document and using an Internet connection.

While the invention has been shown and described with reference certain to exemplary embodiments thereof, it will be understood by those skilled in the art that various changes in form and details may be made therein without departing from the spirit and scope of the invention as defined by the appended claims and their equivalents.

What is claimed is:

1. A portable terminal comprising a pair of housings and a hinge apparatus for coupling the housings in such a way that the housings pivot with respect to each other,
   wherein the hinge apparatus comprises:
      a hinge bracket fixed to a first housing of the pair of housings;

a pivot member connected to a second housing of the pair of housings and pivotably coupled to the hinge bracket to pivot with respect to a hinge axis;

a cam surface provided on the pivot member around the hinge axis, the cam surface comprising at least two recess portions; and a cam member configured to protrude and retreat perpendicular to the hinge axis on the hinge bracket, wherein when the pivot member pivots, the cam member slides and contacts the cam surface and is engaged with one of the recess portions on the cam surface, such that when the cam member engages a first recess portion the housings are stably folded to each other and when the cam member engages another recess portion the housings are kept stationary in a position where the housings are inclined with respect to each other at a predetermined angle.

2. The portable terminal of claim 1, wherein the hinge bracket comprises a cam hole extending perpendicular to the hinge axis, and the cam member is received in the cam hole.

3. The portable terminal of claim 2, wherein an end of the cam hole faces the cam surface.

4. The portable terminal of claim 2, wherein the cam member comprises:
a ball plunger, a portion of which protrudes from an end of the cam hole by protruding or retreating in the cam hole;
an elastic member, an end of which is supported by the ball plunger to pressurize the ball plunger in a predetermined direction; and
an engaging member engaged with another end of the cam hole to support another end of the elastic member,
wherein as the elastic member pressurizes the ball plunger, the portion of the ball plunger protrudes from the end of the cam hole and contacts the cam surface.

5. The portable terminal of claim 4, wherein the cam member further comprises a washer positioned between the ball plunger and the elastic member.

6. The portable terminal of claim 1, further comprising:
a guide member coupled to the pivot member such that the guide member is folded to the first housing or is positioned inclined with respect to the first housing; and
a slide member coupled to the second housing and slidably coupled to the guide member,
wherein as the slide member, together with the second housing, slides on the guide member, a portion of the first housing is opened or closed.

7. The portable terminal of claim 6, wherein the pivot member pivots when the portion of the first housing is opened, such that the second housing is positioned inclined with respect to the first housing.

8. The portable terminal of claim 6, wherein the first housing comprises:
a keypad installed in a first region of a surface and opened or closed by the second housing; and
a receiving recess formed in a second region of the surface, wherein when the pivot member is folded to the first housing, the pivot member is received in the receiving recess.

9. The portable terminal of claim 8, wherein the second region is closed by the second housing regardless of a sliding position of the second housing.

10. The portable terminal of claim 8, wherein the first housing further comprises a mounting recess formed to be recessed from a bottom surface of the receiving recess, and the hinge bracket is fixed to the mounting recess.

11. The portable terminal of claim 6, wherein the guide member comprises guide ribs, side ends of which are bent to cover side ends of the slide member.

12. The portable terminal of claim 11, wherein the second housing comprises avoiding grooves extending in a sliding direction in a surface thereof, and at least a portion of the guide ribs is positioned in the avoiding groove.

13. The portable terminal of claim 11, wherein the guide member further comprises a lubricating member mounted in an inner side of the guide rib between the guide rib and the slide member, the lubricating member comprising a synthetic resin material.

14. The portable terminal of claim 1, further comprising:
a first pivot hole formed to perforate at an end portion of the hinge bracket along the hinge axis;
a second pivot hole formed to perforate at an end portion of the pivot member along the hinge axis; and
a pivot pin coupled through the first pivot hole and the second pivot hole,
wherein the pivot member pivots around the hinge axis while being supported by the pivot pin.

15. The portable terminal of claim 14, further comprising:
a first guide hole formed at an end portion of the hinge bracket, the first guide hole extending from a position spaced apart from the first pivot hole in a circumferential direction around the hinge axis;
a second guide hole formed at an end portion of the pivot member; and
a guide pin, at least a portion of which is positioned in the first guide hole, fixed in the second guide hole,
wherein the guide pin moves along the first guide hole as the pivot member pivots.

16. The portable terminal of claim 15, further comprising support members formed in the hinge bracket to face each other, the support members covering both sides of an end portion of the pivot member, wherein the first pivot hole and the first guide hole are formed in each of the support members.

17. The portable terminal of claim 6, further comprising:
guide recesses formed on a rear surface of the second housing, the guide recesses extending in a moving direction of the second housing;
inclined surfaces provided in the guide recesses; and
interference members formed in the first housing,
wherein during sliding of the second housing, the interference members are received in the guide recesses, and
when a portion of the first housing is opened, the interference members interfere with the inclined surfaces such that the second housing is positioned inclined with respect to the first housing.

18. The portable terminal of claim 17, wherein the inclined surfaces are provided on an end portion of the guide recess.

19. The portable terminal of claim 17, wherein the interference members protrude from a surface of the first housing in a region which is closed at all times by the second housing, and the interference members extend in a sliding direction of the second housing, such that a protruding height of the interference members decreases towards a portion of the first housing which is opened or closed by the second housing.

20. The portable terminal of claim 6, further comprising:
at least one magnetic object installed on a surface of the first housing in a region which is closed at all times by the second housing; and
corresponding metal pieces installed on a side of the second housing,
wherein when a portion of the first housing is opened, the metal pieces are positioned adjacent to the magnetic objects, thus generating attraction, such that the second housing is stably positioned inclined with respect to the first housing.

21. The portable terminal of claim 1, wherein the cam surface further comprises an inclined portion and a protruding portion, in an end of the inclined portion a first recess portion being provided among the recess portions, a second recess portion among the recess portions being disposed adjacent to the first recess portion, and the protruding portion being disposed between the first recess portion and the second recess portion.

22. The portable terminal of claim 21, wherein when the cam member slides and contacts the inclined portion, the pivot member pivots in a direction urging the first recessed portion to be engaged with the cam member.

23. The portable terminal of claim 21, wherein the cam member comprises:
a plunger protruding and retreating in a predetermined direction; and
an elastic member supported at an end thereof by the plunger and providing an elastic force working in a direction pressurizing the cam surface.

24. The portable terminal of claim 23, wherein when a portion of the plunger slides and contacts the inclined portion, the elastic force of the elastic member works as a force pivoting the pivot member in a direction urging the first recessed portion to be engaged with the cam member.

25. The portable terminal of claim 21, further comprising:
a guide member coupled to the pivot member such that the guide member is folded to the first housing or is positioned inclined with respect to the first housing; and
a slide member coupled to the second housing and slidably coupled to the guide member,
wherein as the slide member, together with the second housing, slides on the guide member, a portion of the first housing is opened or closed.

26. The portable terminal of claim 25, wherein when the first housing is closed, the cam member is in contact with the inclined portion, and when a portion of the first housing is opened, the pivot member pivots in a direction urging the first recessed portion to be engaged with the cam member as the cam member slides and contacts the inclined portion.

27. The portable terminal of claim 25, wherein when a portion of the first housing is opened, the cam member is engaged with the first recessed portion, such that the second housing is fixed inclined with respect to the first housing, and the cam member is engaged with one of the first recessed portion and the second recessed portion by pivoting of the pivot member, thereby adjusting an inclined angle of the second housing with respect to the first housing.

28. The portable terminal of claim 21, wherein when the first housing and the second housing are positioned inclined with respect to each other, the pivot member urges the cam member to be engaged with one of the first recessed portion and the second recessed portion, thereby adjusting an inclined angle of the second housing with respect to the first housing.

* * * * *